United States Patent
Kuehn

(10) Patent No.: US 11,846,360 B2
(45) Date of Patent: Dec. 19, 2023

(54) PRESSURE VACUUM VALVE

(71) Applicant: Franklin Fueling Systems, LLC, Madison, WI (US)

(72) Inventor: Justin F. Kuehn, Sun Prairie, WI (US)

(73) Assignee: Franklin Fueling Systems, LLC, Madison, WI (US)

( * ) Notice: Subject to any disclaimer, the term of this patent is extended or adjusted under 35 U.S.C. 154(b) by 744 days.

(21) Appl. No.: 16/681,417

(22) Filed: Nov. 12, 2019

(65) Prior Publication Data
US 2020/0149647 A1    May 14, 2020

Related U.S. Application Data

(60) Provisional application No. 62/767,336, filed on Nov. 14, 2018.

(51) Int. Cl.
*F16K 17/19* (2006.01)
*B67D 7/36* (2010.01)
*B67D 7/78* (2010.01)

(52) U.S. Cl.
CPC ............... *F16K 17/19* (2013.01); *B67D 7/36* (2013.01); *B67D 7/78* (2013.01); *B67D 2210/00031* (2013.01); *B67D 2210/00049* (2013.01)

(58) Field of Classification Search
CPC ...... F16K 17/19; F16K 17/194; F16K 17/196; B67D 7/36
See application file for complete search history.

(56) References Cited

U.S. PATENT DOCUMENTS

| 1,595,668 A | 8/1926 | Kuhl |
| 1,651,051 A | 11/1927 | Wiggins |
| 2,086,969 A | 7/1937 | Strelow |
| 2,088,226 A | 7/1937 | Arvintz |

(Continued)

FOREIGN PATENT DOCUMENTS

| AU | 69119/87 A | 12/1987 |
| AU | 2011213708 A1 | 9/2011 |

(Continued)

OTHER PUBLICATIONS

International Search Report and Written Opinion received for PCT Patent Application No. PCT/US2019/060960, dated Jan. 3, 2020, 10 pages.

(Continued)

*Primary Examiner* — Paul J Gray
(74) *Attorney, Agent, or Firm* — Faegre Drinker Biddle & Reath LLP

(57) ABSTRACT

A P/V valve that can be positioned at a working height above grade (i.e., a height reachable by a service technician positioned at grade) while still providing appropriate resistance to fire and explosion by venting to atmosphere at an appropriate height above grade (e.g., 12 feet) is disclosed. In certain exemplifications of the present disclosure, the P/V valve features a diaphragm actuated two-way poppet valve actuatable by a valve piston. In alternative exemplifications of the present disclosure, the P/V valve is positioned intermediate grade and the distal end of a P/V valve riser pipe and is contained in a vault fluidly connected to the P/V valve riser pipe, the P/V valve locally venting in the vault, which is hermetically sealed to the P/V valve riser pipe.

9 Claims, 12 Drawing Sheets

(56) References Cited

U.S. PATENT DOCUMENTS

| | | |
|---|---|---|
| 2,111,813 A | 3/1938 | Schroeder |
| 2,112,641 A | 3/1938 | Wheaton |
| 2,116,769 A | 5/1938 | Schroeder |
| 2,152,422 A | 3/1939 | Tokheim |
| 2,252,174 A | 8/1941 | Glab |
| 2,587,943 A | 3/1952 | Wiggins |
| 2,591,098 A | 4/1952 | Quist |
| 2,710,625 A | 6/1955 | Quist |
| 2,827,071 A | 3/1958 | Patterson |
| 2,844,165 A | 7/1958 | Morse |
| 2,853,149 A | 9/1958 | Gosselin |
| 2,935,991 A | 5/1960 | Arutunoff |
| 2,971,531 A | 2/1961 | Jurs et al. |
| 3,172,572 A | 3/1965 | Brown et al. |
| 3,208,473 A | 9/1965 | Tadeusz et al. |
| 3,386,468 A | 6/1968 | Dickinson et al. |
| 3,563,263 A | 2/1971 | Benson |
| 3,583,432 A | 6/1971 | Powell et al. |
| 3,613,718 A | 10/1971 | Ballinger |
| 3,621,871 A | 11/1971 | Zimmerle et al. |
| 3,807,465 A | 4/1974 | Ginsburgh et al. |
| 3,831,801 A | 8/1974 | Rodgers |
| 3,881,510 A | 5/1975 | Hansel |
| 3,915,205 A | 10/1975 | Wagner et al. |
| 3,937,358 A | 2/1976 | Smith et al. |
| 3,983,913 A | 10/1976 | Bower |
| 4,009,985 A | 3/1977 | Hirt |
| 4,082,122 A | 4/1978 | McGahey |
| 4,109,674 A | 8/1978 | Beale |
| 4,118,170 A | 10/1978 | Hirt |
| 4,133,346 A | 1/1979 | Smith et al. |
| 4,153,073 A | 5/1979 | Deters |
| 4,157,072 A | 6/1979 | West |
| 4,287,910 A | 9/1981 | Petersen |
| 4,292,020 A | 9/1981 | Hirt |
| 4,977,918 A | 12/1990 | Taylor |
| 5,226,442 A | 7/1993 | Taylor |
| 5,305,807 A | 4/1994 | Healy |
| 5,329,465 A | 7/1994 | Arcella et al. |
| 5,390,713 A | 2/1995 | Fiech |
| 5,464,466 A | 11/1995 | Nanaji et al. |
| 5,479,978 A | 1/1996 | Zenkich |
| 5,484,000 A | 1/1996 | Hasselmann |
| 5,755,854 A | 5/1998 | Nanaji |
| 5,803,115 A | 9/1998 | Vertanen et al. |
| 5,803,136 A | 9/1998 | Hartsell |
| 5,839,465 A | 11/1998 | Phillips et al. |
| 5,843,212 A | 12/1998 | Nanaji |
| 5,899,227 A | 5/1999 | Stuart |
| 5,913,330 A | 6/1999 | Jones et al. |
| 5,957,157 A | 9/1999 | Mitchell et al. |
| 5,992,395 A | 11/1999 | Hartsell, Jr. et al. |
| 6,019,126 A | 2/2000 | Kelada |
| 6,029,697 A | 2/2000 | Phillips et al. |
| 6,047,687 A | 4/2000 | Ishikawa et al. |
| 6,059,856 A | 5/2000 | Ohlrogge et al. |
| 6,102,085 A | 8/2000 | Nanaji |
| 6,193,500 B1 | 2/2001 | Bradt et al. |
| 6,223,765 B1 | 5/2001 | Small et al. |
| 6,302,165 B1 | 10/2001 | Nanaji et al. |
| 6,325,090 B1 * | 12/2001 | Horne ............... E03C 1/108 137/512 |
| 6,338,369 B1 | 1/2002 | Shermer et al. |
| 6,357,493 B1 | 3/2002 | Shermer et al. |
| 6,386,246 B2 | 5/2002 | Pope et al. |
| 6,481,592 B2 | 11/2002 | Harris |
| 6,564,615 B1 | 5/2003 | Carter |
| 6,637,976 B2 | 10/2003 | Stanton |
| 6,675,110 B2 | 1/2004 | Engelmann |
| 6,712,101 B1 | 3/2004 | Nanaji |
| 6,761,190 B2 | 7/2004 | Nanaji |
| 6,763,856 B2 | 7/2004 | Healy |
| 6,805,173 B2 | 10/2004 | Healy |
| 6,810,922 B1 | 11/2004 | Grantham |
| 6,836,732 B2 | 12/2004 | Tiberi |
| 6,840,292 B2 | 1/2005 | Hart et al. |
| 6,848,465 B1 | 2/2005 | Ledbetter |
| 6,939,080 B2 | 9/2005 | Wokas |
| 6,973,938 B2 | 12/2005 | Mitchell |
| 7,555,935 B2 | 7/2009 | Baillargeon et al. |
| 7,566,358 B2 | 7/2009 | Hart et al. |
| 8,060,335 B2 | 11/2011 | Tiberi |
| 8,075,677 B2 | 12/2011 | Schroeder et al. |
| 8,141,577 B2 | 3/2012 | Wyper et al. |
| 8,171,953 B2 | 5/2012 | Adams et al. |
| 8,256,471 B2 | 9/2012 | Selles |
| 8,381,775 B2 | 2/2013 | Healy |
| 8,435,334 B2 | 5/2013 | Hart et al. |
| 8,529,677 B2 | 9/2013 | Schroeder et al. |
| 8,679,230 B2 | 3/2014 | Strickland |
| 8,770,237 B2 | 7/2014 | Bolt et al. |
| 9,435,449 B2 | 9/2016 | Shelly |
| 9,533,251 B2 | 1/2017 | Tschantz |
| 9,604,837 B2 | 3/2017 | Brown et al. |
| 9,677,712 B2 | 6/2017 | Evans et al. |
| 2005/0080589 A1 | 4/2005 | Tiberi |
| 2007/0070093 A1 | 3/2007 | Lin et al. |
| 2007/0131281 A1 | 6/2007 | Manger |
| 2009/0007983 A1 | 1/2009 | Tealy |
| 2012/0145933 A1 | 6/2012 | Wyper et al. |
| 2015/0034180 A1 | 2/2015 | Balsdon et al. |
| 2015/0167857 A1 | 6/2015 | Myers et al. |
| 2016/0138725 A1 | 5/2016 | Myers et al. |
| 2017/0138439 A1 | 5/2017 | Civiero et al. |
| 2017/0138493 A1 * | 5/2017 | Yamaguchi ......... F16K 27/0209 |
| 2018/0093825 A1 | 4/2018 | Young et al. |
| 2018/0105411 A1 | 4/2018 | Stuart |

FOREIGN PATENT DOCUMENTS

| | | |
|---|---|---|
| CA | 1056779 A | 6/1979 |
| CN | 104930231 A | 9/2015 |
| DE | 2701499 A1 | 7/1978 |
| EP | 0122194 A1 | 10/1984 |
| EP | 0799790 A1 | 10/1997 |
| EP | 3277619 B1 | 8/2018 |
| FR | 2544047 A1 | 10/1984 |
| GB | 2388645 A | 11/2003 |
| GB | 2454723 A | 5/2009 |
| JP | 06-186575 A | 7/1994 |
| JP | 2008-145998 A | 6/2008 |
| JP | 2013-076739 A | 4/2013 |
| KR | 10-2007-0041934 A | 4/2007 |
| KR | 10-0905738 B1 | 7/2009 |
| WO | 93/16310 A1 | 8/1993 |
| WO | 97/28083 A2 | 8/1997 |
| WO | 03/95965 A2 | 11/2003 |
| WO | 2008/144273 A1 | 11/2008 |
| WO | 2009/013544 A2 | 1/2009 |
| WO | 2016/191761 A1 | 12/2016 |
| WO | 2018/036661 A1 | 3/2018 |

OTHER PUBLICATIONS

Invitation to Pay Additional Fees received for PCT Patent Application No. PCT/US2019/060960, dated Jan. 22, 2020, 3 pages.

Extended European Search Report received for EP application No. 19884304.7, dated Dec. 2, 2022, 22 pages.

* cited by examiner

PRESSURE VACUUM VALVE

CROSS-REFERENCE TO RELATED APPLICATION

This application claims priority to U.S. Provisional Application Ser. No. 62/767,336 filed on Nov. 14, 2018, the entire disclosure of which is hereby explicitly incorporated by reference in its entirety.

BACKGROUND OF THE DISCLOSURE

1. Field of the Disclosure

This disclosure relates generally to a pressure/vacuum valve for relieving over and/or under pressure conditions in a storage tank and, more particularly, to a pressure/vacuum valve for use with a fuel storage tank and which can be positioned at a working height above grade with an atmospheric vent fluidly connected to the pressure/vacuum valve and extending to a vent height, as required by fire code.

2. Description of the Related Art

Hydrocarbon fuels can be stored in aboveground and underground storage tanks AST and UST, respectfully). No matter the position of the storage tank, over and under pressure situations in the storage tank can develop, which can have deleterious effects on fueling system components and/or performance.

Transfer of fuel from a fuel storage tank to a fuel reservoir is typically accompanied by recovery of the vapor from the recipient fuel reservoir in a process known in the art as vapor recovery. In short, vapor recovery replaces the vapor of the recipient fuel reservoir with fuel, while adding the removed vapor from the recipient fuel reservoir to the ullage space (i.e., the volume of the fuel storage tank not occupied by liquid fuel) of the fuel storage tank. Vapor recovery systems and processes (and the failure of certain components of the same) can lead to over and under pressure situations in the fuel storage tank. Environmental conditions (e.g., temperature) and/or sudden changes in the same can contribute to such effects.

For example, during the fueling of vehicles, liquid gasoline is delivered from the fuel storage tank (e.g., a UST) to the vehicle fuel tank thereby displacing a mixture of gasoline vapor and air from the vehicle fuel tank. To minimize release of gasoline vapor into the atmosphere, gasoline dispenser nozzles equipped with vapor recovery apparatus collect the displaced gasoline vapor and air and deliver it to the ullage of the UST. Preferably, a 1:1 ratio is sought between the volume of liquid gasoline drawn from the UST to the volume of gasoline vapor and air returned into the ullage by the vapor recovery system; however, this balance is difficult to achieve, and excess or insufficient air and gasoline vapor can be introduced into the UST in place of the dispensed fuel, thereby creating over or under pressure conditions in the UST. Also, newer vehicles include on-board vapor recovery systems that manage the vapors displaced during the vehicle filling process. In this example, air is returned to the UST rather than saturated vapor. When exposed to fuel in the tank, the air expands as it saturates, causing pressure in the UST to increase.

Similarly, during addition of fuel to a fuel storage tank, liquid gasoline is delivered from a tanker truck to the fuel storage tank (e.g., a UST) thereby displacing a mixture of gasoline vapor and air from inside the fuel storage tank. To minimize release of gasoline vapor into the atmosphere, tanker trucks can be equipped with vapor recovery systems to collect the displaced gasoline vapor and air and deliver it to the now empty portion of the compartment of the tanker truck being used to fill the UST. As with vapor recovery utilized when fueling vehicles from a fuel storage tank, an appropriate balance in the exchange of liquid fuel for fuel vapor and air can be difficult to achieve, with the fuel storage tank potentially being placed in either an over or under pressure condition.

To relieve over or under pressure in a fuel storage tank, a pressure/vacuum (P/V) valve is placed in fluid communication with the fuel storage tank to allow venting to the atmosphere. In an over pressure situation, the excess pressure can escape to atmosphere through the P/V valve. In an under pressure or vacuum situation, the P/V valve allows air from outside the fuel storage tank to enter the fuel storage tank. The P/V valve can be designed to operate (i.e., open) at specific pressure and vacuum values.

In the United States, the National Fire Protection Association (NFPA) code (i.e., NFPA 30) requires that a P/V valve connected to a fuel storage tank be positioned 12 feet above grade. Similar codes and/or regulations can be found in other jurisdictions. To meet such fire codes, P/V valves are typically positioned atop riser pipes extending adjacent to the manholes covering the riser pipe/drop tube combinations utilized for fuel tank loading or are positioned atop riser pipes extending through the canopy covering the fuel dispensers at a fueling station. Positioning P/V valves in this way safely vents fuel vapor at an appropriate (according to fire code) height, but creates a barrier to easily accessing the P/V valve for service or replacement.

SUMMARY OF THE DISCLOSURE

The present disclosure provides a P/V valve that can be positioned at a working height above grade (i.e., a height reachable by a service technician positioned at grade) while still providing appropriate resistance to fire and explosion by venting to atmosphere at an appropriate height above grade (e.g., 12 feet). In certain exemplifications of the present disclosure, the P/V valve features a diaphragm actuated two-way poppet valve actuatable by a valve piston. In alternative exemplifications of the present disclosure, the P/V valve is positioned intermediate grade and the distal end of a P/V valve riser pipe and is contained in a vault fluidly connected to the P/V valve riser pipe, the P/V valve locally venting in the vault, which is hermetically sealed to the P/V valve riser pipe.

In one form thereof, the present disclosure provides a pressure/vacuum vent for a storage tank, comprising: a pressure/vacuum valve, comprising: a pressure/vacuum valve housing defining a first port fluidly connecting an interior of the pressure/vacuum valve housing and an exterior of the housing, and a second port fluidly connecting an interior of the housing and an exterior of the housing; a valve assembly actuatable to selectively allow a vacuum inlet flow from the second port of the pressure/vacuum valve housing to the first port of the pressure/vacuum valve housing and further actuatable to selectively allow a pressure outlet flow from the first port of the pressure/vacuum valve housing to the second port of the pressure/vacuum valve housing; a pressure/vacuum valve riser pipe for fluid communication with the storage tank; a vault in fluid communication with the pressure/vacuum valve riser pipe, with a lower segment of the pressure/vacuum valve riser pipe fluidly connected to the vault and an upper segment of the pressure/vacuum valve riser pipe fluidly connected to the vault, the vault positioned at a vault height above a grade level and the upper segment of the pressure/vacuum valve riser pipe terminates at a vent height above the grade level, the vent height being greater than the vault height, whereby the vault is positioned intermediate the lower segment of the pressure/vacuum valve riser pipe and the upper segment of the pressure/vacuum valve riser pipe, the vault sized to selectively receive and enclose the pressure/vacuum valve with the first port of the pressure/vacuum valve housing in fluid communication with the lower segment of the pressure/vacuum valve riser pipe and with the second port of the pressure/vacuum valve housing in fluid communication with the upper segment of the pressure/vacuum valve riser pipe via the vault; with the pressure/vacuum valve operably received in the vault, the valve assembly selectively providing a fluid connection between the lower segment of the pressure/vacuum valve riser pipe and an interior of the vault, whereby the valve assembly is actuatable to allow the vacuum inlet flow to travel into the upper segment of the pressure/vacuum valve riser pipe to the interior of the vault, through the valve assembly and the lower segment of the pressure/vacuum valve riser pipe and into the storage tank, whereby the valve assembly is further actuatable to allow the pressure outlet flow to travel from the storage tank into the lower segment of the pressure/vacuum valve riser pipe, through the valve assembly to the interior of the vault and through the upper segment of the pressure/vacuum valve riser pipe. In exemplary embodiments of this form of the present disclosure, the pressure/vacuum valve is selectively securable relative to the vault, the pressure/vacuum valve removable from the vault while the lower segment of the pressure/vacuum valve riser pipe and the upper segment of the pressure/vacuum valve riser pipe remain fluidly connected to the vault. In exemplary embodiments of this form of the present disclosure, the pressure/vacuum valve housing is selectively threadedly connected to the vault to secure the pressure/vacuum valve relative to the vault. In exemplary embodiments of this form of the present disclosure, the valve assembly comprises: a vent inlet selectively openable to allow the vacuum inlet flow from the second port of the pressure/vacuum valve housing to the first port of the pressure/vacuum valve housing; and a pressure outlet selectively openable to allow the pressure outlet flow from the first port of the pressure/vacuum valve housing to the second port of the pressure/vacuum valve housing. In exemplary embodiments of this form of the present disclosure, the vault comprises: a vault housing defining an interior sized and shaped to receive the pressure/vacuum valve; and a vault cover selectively securable and hermetically sealable to the vault housing, whereby the vault cover is selectively removable to provide access to the pressure/vacuum valve contained in the interior of the vault housing. In exemplary embodiments of this form of the present disclosure, the vault is positioned in-line with the lower segment of the pressure/vacuum valve riser pipe and the vault is positioned in-line with the upper segment of the pressure/vacuum valve riser pipe such that a longitudinal axis of the lower segment of the pressure/vacuum valve riser pipe and a longitudinal axis of the upper segment of the pressure/vacuum valve riser pipe both intersect the pressure/vacuum valve when it is operably secured within the vault. In exemplary embodiments of the present disclosure, the pressure/vacuum valve is removable as a subassembly from the vault.

In another form thereof, the present disclosure provides a pressure/vacuum vent for a storage tank, comprising: a pressure/vacuum valve riser pipe for fluid communication with the storage tank and with atmosphere, the pressure/vacuum valve riser pipe including a storage tank end and an atmosphere port, the pressure/vacuum valve riser pipe including a chamber positioned intermediate the storage tank end and the atmosphere port; and a pressure/vacuum valve, the chamber sized to receive the pressure/vacuum valve, the pressure/vacuum valve selectively securable within the chamber in fluid communication with the pressure/vacuum valve riser pipe and operable to selectively block flow through the pressure/vacuum valve riser pipe, the chamber positioned in-line with a longitudinal axis of the pressure/vacuum valve riser pipe such that the longitudinal axis of the pressure/vacuum valve riser pipe intersects the pressure/vacuum valve when the pressure/vacuum valve is secured within the chamber in fluid communication with the pressure/vacuum valve riser pipe and operable to selectively block fluid flow through the pressure/vacuum valve riser pipe. In exemplary embodiments of this form of the present disclosure, the pressure/vacuum valve riser pipe comprises a vault, the vault comprising: a vault housing defining an interior, the interior comprising the chamber sized to receive the pressure/vacuum valve; and a vault cover selectively securable and hermetically sealable to the vault housing, whereby the vault cover is selectively removable to provide access to a pressure/vacuum valve contained in the interior of the vault housing. In exemplary embodiments of this form of the present disclosure, the chamber defines a chamber cross sectional area relative to the longitudinal axis of the pressure/vacuum valve riser pipe comprising a largest cross-sectional area of the pressure/vacuum valve riser pipe. In exemplary embodiments of this form of the present disclosure, the chamber is positioned at a chamber height above a grade level, the pressure/vacuum valve riser pipe in fluid communication with atmosphere at a vent height above the grade level, the vent height being greater than the chamber height. In exemplary embodiments of this form of the present disclosure, the pressure/vacuum valve riser pipe comprises a lower segment of the pressure/vacuum valve riser pipe fluidly connected to the vault and an upper segment of the pressure/vacuum valve riser pipe fluidly connected to the vault, the lower segment of the pressure/vacuum valve riser pipe and the vault positioned in-line with the upper segment of the pressure/vacuum valve riser pipe such that a longitudinal axis of the lower segment of the pressure/vacuum riser pipe and a longitudinal axis of the upper segment of the pressure/vacuum riser pipe both intersect the pressure/vacuum valve when it is operably secured within the vault. In exemplary embodiments of this form of the present disclosure, the pressure/vacuum valve comprises a pressure/vacuum valve housing defining a first port fluidly connecting an interior of the pressure/vacuum valve housing and an exterior of the pressure/vacuum valve housing, and a second port fluidly connecting an interior of the pressure/vacuum valve housing and an exterior of the pressure/vacuum valve housing; a vent inlet selectively openable to allow a vacuum inlet flow from the second port of the pressure/vacuum valve housing to the first port of the pressure/vacuum valve housing; a pressure outlet selectively openable to allow a pressure outlet flow from the first port of the pressure/vacuum valve housing to the second port of the pressure/vacuum valve housing. In exemplary embodiments of this form of the present disclosure, the pressure/vacuum valve is selectively securable relative to the vault, the pressure/vacuum valve removable from the vault while the lower segment of the pressure/vacuum valve riser pipe and the upper segment of the pressure/vacuum valve riser pipe remain fluidly connected to the vault.

In a further form thereof, the present disclosure provides a pressure/vacuum valve, comprising: a pressure/vacuum valve housing defining a first port fluidly connecting an interior of the housing and an exterior of the housing, and a second port fluidly connecting an interior of the housing and an exterior of the housing; a valve piston displaceable within the pressure/vacuum valve housing from an upper position to a lower position, a reciprocation of the valve piston opening a flow path between the first port and the second port, an outer periphery of the valve piston sealed relative to the pressure/vacuum valve housing, the valve piston biased to a rest position blocking the flow path between the first port and the second port, the valve piston presenting a valve piston surface area in fluid communication with the first port, the valve piston displaceable in a first direction to move the valve piston relative to a pressure valve body and thereby unseat the pressure valve body from a pressure valve seat in response to positive pressure communicated from the first port to the valve piston surface area, the valve piston displaceable in a second direction together with the pressure valve body to unseat a vacuum valve body from a vacuum valve seat in response to a vacuum communicated from the first port to the valve piston surface. In exemplary embodiments of this form of the present disclosure, the pressure/vacuum valve further comprises a diaphragm secured to the valve piston and to the pressure/vacuum valve housing, the diaphragm sealing the valve piston relative to the pressure/vacuum valve housing. In exemplary embodiments of this form of the present disclosure, the pressure valve seat is position inward from a periphery of the valve piston. In exemplary embodiments of this form of the present disclosure, displacement of the valve piston in the second direction causes displacement of the pressure valve body to unseat the vacuum valve body from the vacuum valve seat. In exemplary embodiments of this form of the present disclosure, the pressure/vacuum valve is provided in combination with a storage tank, the combination further comprising a pressure/vacuum valve riser pipe in fluid communication with the storage tank and the pressure/vacuum valve. In exemplary embodiments of this form of the present disclosure, the combination further comprises a vault in fluid communication with the pressure/vacuum valve riser pipe, with a lower segment of the pressure/vacuum valve riser pipe fluidly connected to the vault and an upper segment of the pressure/vacuum valve riser pipe fluidly connected to the vault, the vault positioned at a vault height above a grade level and the upper segment of the pressure/vacuum valve riser pipe terminates at a vent height above the grade level, the vent height being greater than the vault height, whereby the vault is positioned intermediate the lower segment of the pressure/vacuum valve riser pipe and the upper segment of the pressure/vacuum valve riser pipe, the vault sized to receive the pressure/vacuum valve housing, with the first port of the pressure/vacuum valve housing in fluid communication with the lower segment of the pressure/vacuum valve riser pipe and with the second port of the pressure/vacuum valve housing selectively providing a fluid connection between the lower segment of the pressure/vacuum valve riser pipe and an interior of the vault. In exemplary embodiments of this form of the present disclosure, the pressure/vacuum valve is selectively securable relative to the vault, the pressure/vacuum valve removable from the vault while the lower segment of the pressure/vacuum valve riser pipe and the upper segment of the pressure/vacuum valve riser pipe remain fluidly connected to the vault. In exemplary embodiments of this form of the present disclosure, the vault positioned in-line with the lower segment of the pressure/vacuum valve riser pipe and the vault positioned in-line with the upper segment of the pressure/vacuum valve riser pipe such that a longitudinal axis of the lower segment of the pressure/vacuum valve riser pipe and a longitudinal axis of the upper segment of the pressure/vacuum valve riser pipe both intersect the pressure/vacuum valve when it is operably secured with the vault.

In yet another form thereof, the present disclosure provides a pressure/vacuum valve kit, comprising: a pressure/vacuum valve, comprising: a pressure/vacuum valve housing defining a first port fluidly connecting an interior of the pressure/vacuum valve housing and an exterior of the housing, and a second port fluidly connecting an interior of the housing and an exterior of the housing; a valve assembly actuatable to selectively allow a vacuum inlet flow from the second port of the pressure/vacuum valve housing to the first port of the pressure/vacuum valve housing and further actuatable to selectively allow a pressure outlet flow from the first port of the pressure/vacuum valve housing to the second port of the pressure/vacuum valve housing; and a pressure/vacuum valve connector operable to secure the pressure/vacuum valve in an operable position to regulate flow through the pressure/vacuum valve; an adapter comprising an adapter conduit and an adapter connector, the adapter connector complementary to the pressure/vacuum valve connector so that engagement of the adapter connector with the pressure/vacuum valve connector secures the adapter to the pressure/vacuum valve with the adapter conduit in fluid communication with the first port of the pressure/vacuum valve housing, the adapter further securable to a pressure/vacuum valve riser pipe for fluid communication with a storage tank, whereby, with the adapter secured to the pressure/vacuum valve riser pipe and the pressure/vacuum valve secured to the adapter, the valve assembly of the pressure/vacuum valve is in fluid communication with the storage tank; and a vault including an inlet and a chamber sized to receive the pressure/vacuum valve, the vault including a vault connector, the vault connector complementary to the pressure/vacuum valve connector so that engagement of the vault connector with the pressure/vacuum valve connector secures the pressure/vacuum valve to the vault with the inlet to the vault in fluid communication with the first port of the pressure/vacuum valve housing, the vault further securable to the pressure/vacuum valve riser pipe for fluid communication with the storage tank, whereby, with the vault secured to the pressure/vacuum valve riser pipe and the pressure/vacuum valve secured to the vault, the valve assembly of the pressure/vacuum valve is in fluid communication with the storage tank. In exemplary embodiments of this form of the present disclosure, the valve assembly comprises a valve piston displaceable within the pressure/vacuum valve housing from an upper position to a lower position, a reciprocation of the valve piston opening a flow path between the first port and the second port, an outer periphery of the valve piston sealed relative to the pressure/vacuum valve housing, the valve piston biased to a rest position blocking the flow path between the first port and the second port, the valve piston presenting a valve piston surface area in fluid communication with the first port, the valve piston displaceable in a first direction to move the valve piston relative to a pressure valve body and thereby unseat the pressure valve body from a pressure valve seat in response to positive pressure communicated from the first port to the valve piston surface area, the valve piston displaceable in a second direction together with the pressure valve body to unseat a vacuum valve body from a vacuum valve seat in response to a vacuum communicated from the first port to the valve piston surface area. In exemplary embodiments of this form of the present disclosure, further comprise a diaphragm secured to the valve piston and to the pressure/vacuum valve housing, the diaphragm sealing the valve piston relative to the pressure/vacuum valve housing. In exemplary embodiments of this form of the present disclosure, the pressure valve seat is positioned inward from a periphery of the valve piston. In exemplary embodiments of this form of the present disclosure, displacement of the valve piston in the second direction causes displacement of the pressure valve body to unseat the vacuum valve body from the vacuum valve seat. In exemplary embodiments of this form of the present disclosure, the pressure/vacuum valve kit is provided in combination with a storage tank, the combination further comprising a pressure/vacuum valve riser pipe in fluid communication with the storage tank and the pressure/vacuum valve. In exemplary embodiments of this form of the present disclosure, the vault is in fluid communication with the pressure/vacuum valve riser pipe, with a lower segment of the pressure/vacuum valve riser pipe fluidly connected to the vault and an upper segment of the pressure/vacuum valve riser pipe fluidly connected to the vault, the vault positioned at a vault height above a grade level and the upper segment of the pressure/vacuum valve riser pipe terminates at a vent height above the grade level, the vent height being greater than the vault height, whereby the vault is positioned intermediate the lower segment of the pressure/vacuum valve riser pipe and the upper segment of the pressure/vacuum valve riser pipe, the vault sized to receive the pressure/vacuum valve housing, with the first port of the pressure/vacuum valve housing in fluid communication with the lower segment of the pressure/vacuum valve riser pipe and with the second port of the pressure/vacuum valve housing selectively providing a fluid connection between the lower segment of the pressure/vacuum valve riser pipe and an interior of the vault.

In yet a further form thereof, the present disclosure provides: a pressure/vacuum vent for a storage tank, comprising: a vault comprising a vault housing defining a chamber, a first vault port in fluid communication with the chamber and a second vault port in fluid communication with the chamber; and a pressure/vacuum valve comprising: a pressure/vacuum valve housing including a first valve housing port fluidly connecting an interior of the pressure/vacuum valve housing and an exterior of the pressure/vacuum valve housing, the valve housing further including a second valve housing port fluidly connecting an interior of the pressure/vacuum valve and an exterior of the pressure/vacuum valve housing; a valve assembly actuatable to selectively allow a vacuum inlet flow from the second valve housing port of the pressure/vacuum valve to the first valve housing port of the pressure/vacuum valve and further actuatable to selectively allow a pressure outlet flow from the first valve housing port of the pressure/vacuum valve to the second valve housing port of the pressure/vacuum valve; and a connector selectively securing the pressure/vacuum valve within the chamber with the first valve housing port of the pressure/vacuum valve in fluid communication with the first vault port, the pressure/vacuum valve removable as a subassembly from the vault, with the valve assembly actuated to allow the pressure outlet flow, the first vault port fluidly connected by the valve assembly to the chamber of the vault to allow the pressure outlet flow to pass from the first vault port into the valve housing, then through the valve assembly and then into the chamber; with the valve assembly actuated to allow the vacuum inlet flow, the chamber of the vault fluidly connected by the valve assembly to the first valve housing port to allow the vacuum inlet flow to pass from the chamber of the vault into the valve housing, then through the valve assembly and then into the first vault port. In exemplary embodiments of this form of the present disclosure, the pressure/vacuum vent further comprises a pressure/vacuum valve riser pipe for fluid communication with the storage tank, the vault in fluid communication with the pressure/vacuum valve riser pipe, the vault positioned in-line with the pressure/vacuum valve riser pipe such that a longitudinal axis of the pressure/vacuum valve riser pipe intersects the pressure/vacuum valve when it is operably secured within the vault. In exemplary embodiments of this form of the present disclosure, the vault comprises a vault cover selectively securable and hermetically sealable to the vault housing, whereby the vault cover is selectively removable to provide access to a pressure/vacuum valve contained in the interior of the vault housing.

In yet a further form thereof, the present disclosure provides a pressure/vacuum vent for a storage tank, comprising a pressure/vacuum valve riser pipe connectable in fluid communication with the storage tank, the pressure/vacuum valve riser pipe comprising a lower segment; and an upper segment; a vault, comprising a vault housing; and a vault cover, the vault cover selectively securable and hermetically sealable to the vault housing; the lower segment of the pressure/vacuum valve riser pipe hermetically sealed to the vault to fluidly connect the vault to the storage tank when the pressure/vacuum valve riser pipe is connected in fluid communication with the storage tank, the upper segment of the pressure/vacuum valve riser pipe hermetically sealed to the vault to fluidly connect the upper segment of the pressure/vacuum valve riser pipe to the lower segment of the pressure/vacuum valve riser pipe when the vault cover is hermetically sealed to the vault housing; and a pressure/vacuum valve, the vault sized to receive and enclose the pressure/vacuum valve within a vault chamber defined by the vault housing and the vault cover when the vault cover is secured to the vault housing, the pressure/vacuum valve operably positionable in the vault to selectively allow a pressure flow from the lower segment of the pressure/vacuum valve riser pipe to the upper segment of the pressure/vacuum valve riser pipe at a pressure greater than or equal to a valve cracking pressure and to selectively allow a vacuum flow from the upper segment of the pressure/vacuum valve riser pipe to the lower segment of the pressure/vacuum valve riser pipe at a valve cracking vacuum greater than or equal to a valve cracking vacuum, whereby the valve prevents fluid communication between the upper segment of the pressure/vacuum valve riser pipe and the lower segment of the pressure/vacuum valve riser pipe is neither the valve cracking pressure nor the valve cracking vacuum is received at the pressure/vacuum valve, with the pressure/vacuum valve removed from the vault, and the vault cover secured and hermetically sealed to the vault housing, the lower segment of the pressure/vacuum valve riser pipe in constant fluid communication with the upper segment of the pressure/vacuum valve riser pipe. In exemplary embodiments of this form of the present disclosure, the vault is positioned in-line with the lower segment of the pressure/vacuum valve riser pipe and the vault is positioned in-line with the upper segment of the pressure/vacuum valve riser pipe such that a longitudinal axis of the lower segment of the pressure/vacuum valve riser pipe and a longitudinal axis of the upper segment of the pressure/vacuum valve riser pipe both intersect the pressure/vacuum valve when it is operably positioned in the vault. In exemplary embodiments of this form of the present disclosure, the pressure/vacuum valve is removable as a subassembly from the vault. In exemplary embodiments of this form of the present disclosure, with the pressure/vacuum valve riser pipe operably connected in fluid communication with the storage tank, the vault is positioned at a working height above a grade level and the upper segment of the pressure/vacuum valve riser pipe is in fluid communication with atmosphere at a vent height above the grade level, the vent height greater than the working height.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
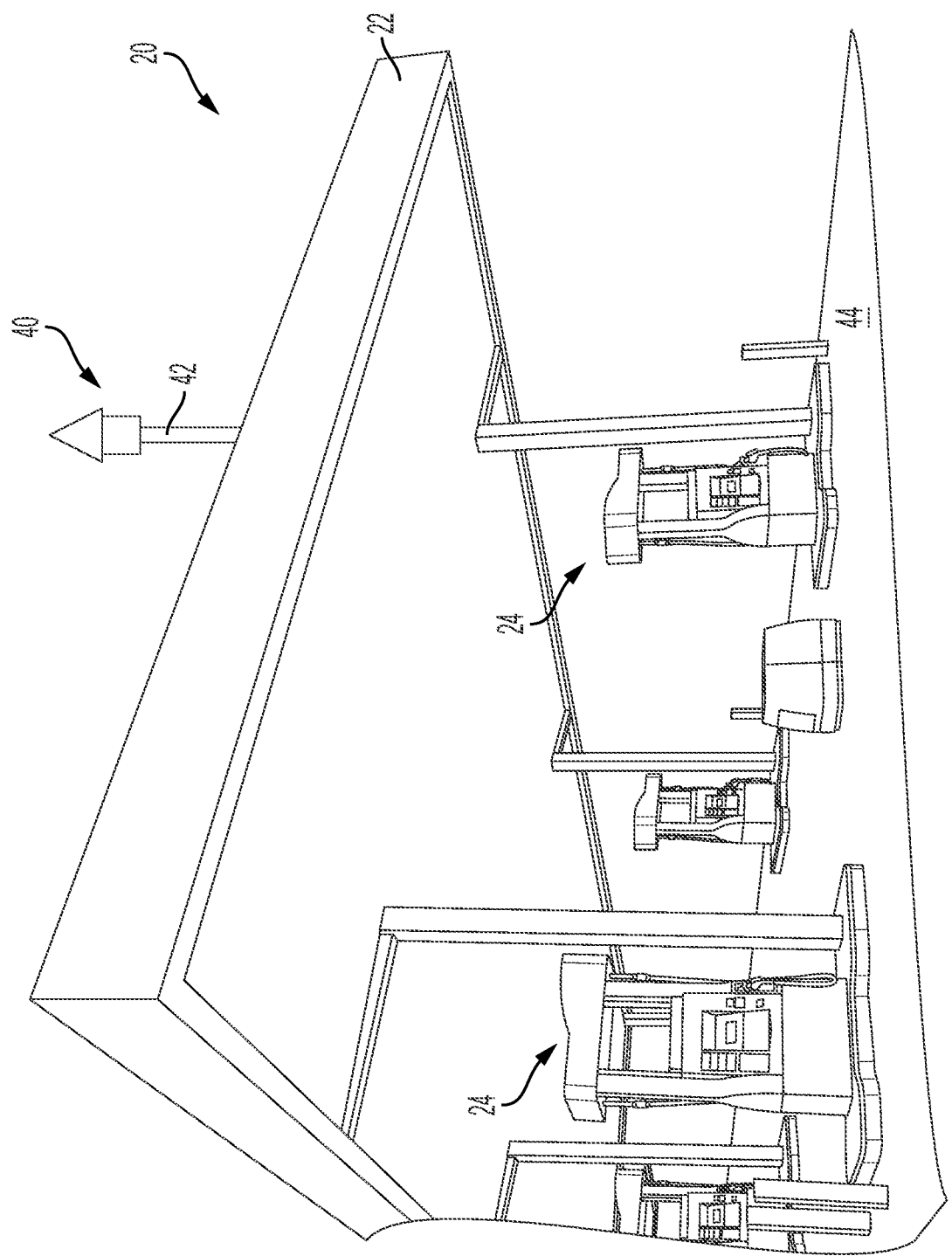
FIG. 1 is a partial perspective view of an exemplary fueling station.

For the purposes of promoting an understanding of the principles of the present disclosure, reference is now made to the embodiments illustrated in the drawings, which are described below. The embodiments disclosed below are not intended to be exhaustive or limit the present disclosure to the precise forms disclosed in the following detailed description. Rather, the embodiments are chosen and described so that others skilled in the art may utilize their teachings. Therefore, no limitation of the scope of the present disclosure is thereby intended.

Figure 2:
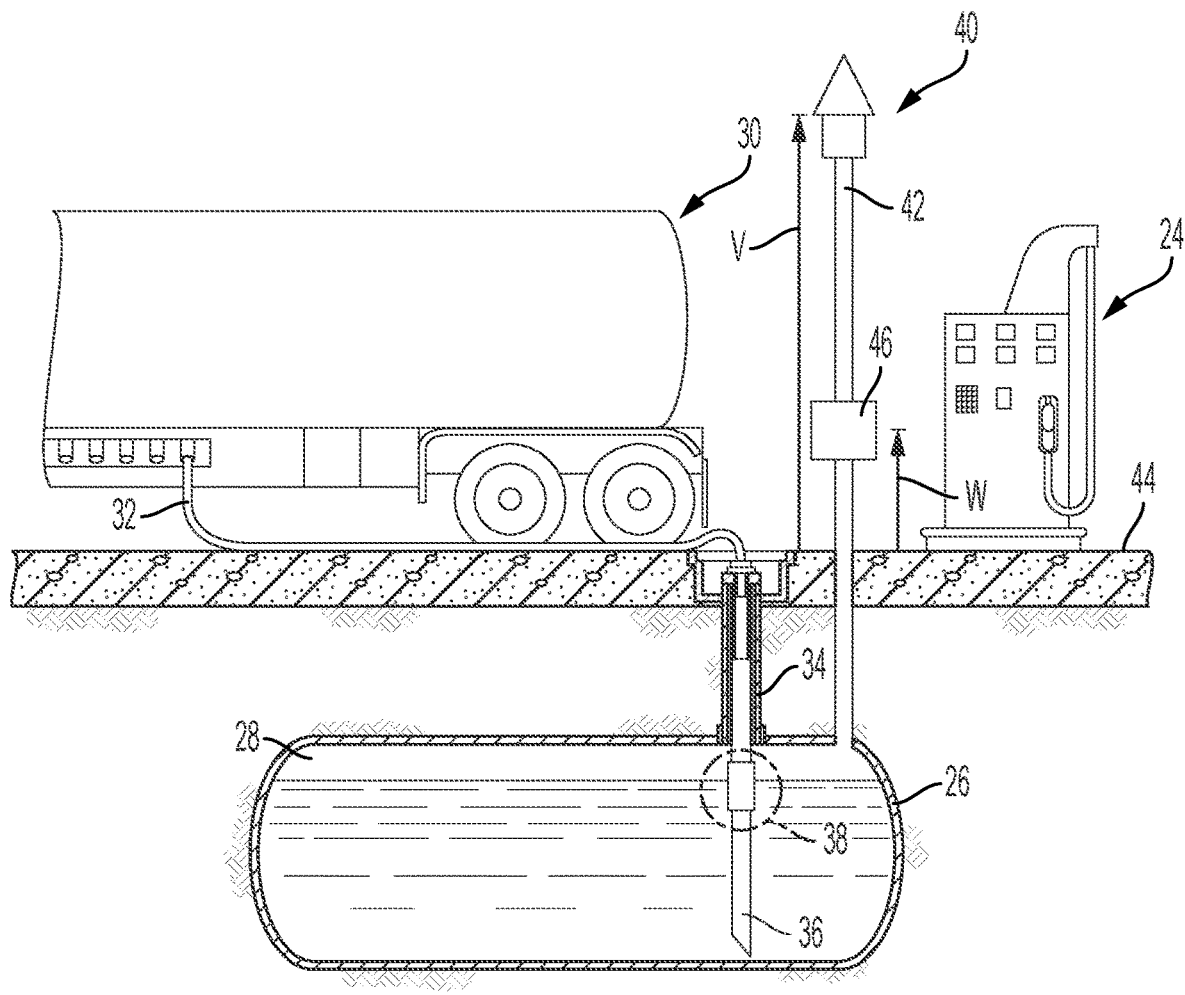
FIG. 2 is a representation of a fueling station showing a tanker truck filling an underground fuel storage tank.

FIGS. 1 and 2 illustrate fueling station 20. As shown in FIG. 1, fueling station 20 features canopy 22 covering fuel dispensers 24. FIG. 2 illustrates fuel dispenser 24 together with tanker truck 30 positioned to fill UST 26. Fuel dispenser 24 is in fluid communication with UST 26 and is operable to dispense fuel contained in UST 26. In the event that fuel from UST 26 is dispensed into a vehicle, a vapor recovery system may be utilized to exchange air and fuel vapor from the vehicle for the dispensed fuel. Stated another way, as fuel from UST 26 is dispensed into the vehicle, air and vapor from the vehicle may be collected and transferred to ullage 28 of UST 26, if stage II vapor recovery is provided at the fueling station in question. A similar exchange takes place between UST 26 and tanker truck 30 on filling of UST 26 from tanker truck 30.

FIG. 2 illustrates tanker truck 30 fluidly connected to UST 26 by fill hose 32 so that the liquid fuel contained in tanker truck 30 can be deposited in UST 26. As illustrated in FIG. 2, UST 26 includes riser pipe 34 extending upwardly therefrom, with drop tube 36 extending through riser pipe 34 into UST 26 in a conventional manner. Also illustrated is overfill prevention valve 38, which functions to prevent overfilling of UST 26. When filling UST 26 from tanker truck 30, a vapor recovery system will be used to replace the fuel dropped into UST 26 from tanker truck 30 with a similar volume of air and fuel vapor from UST 26.

As illustrated in FIG. 2, P/V valve 40 is fluidly connected via P/V valve riser pipe 42 to ullage 28 of UST 26. P/V valve 40 is shown at a height above grade 44 sufficient to comply with fire code (e.g., 12 feet above grade 44). An alternative configuration of P/V valve 40 is shown in FIG. 1, with P/V valve riser pipe 42 protruding upwardly from canopy 22 positioned above fuel dispensers 24. In one aspect of the present disclosure, P/V valve 40 can be positioned at a working height W (FIG. 2) while still providing appropriate resistance to fire and explosion by venting to atmosphere at an appropriate height above grade (e.g., 12 feet). For example, a P/V valve of the present disclosure can be positioned in vault 46 positioned at a working height W while venting to atmosphere at a vent height V that is greater than working height W, as will be further described below. While P/V valve 40 is illustrated in conjunction with a UST, similar configurations can be utilized with an AST. P/V valve 40 may be connected to the ullage 28 of one or many UST's 26. If connected to more than one UST 26, a manifold may be used to connect multiple UST's to a single P/V valve 40. In exemplifications of the present disclosure, vault 46 can comprise a ductile iron housing providing protection of an enclosed P/V valve 40, which, owing to the protection provided by enclosure of P/V valve 40 in the vault, can be made of molded plastic parts and be placed at a working height without fear of damage. Vault 46 can provide similar protection and be made of steel (including stainless steel). Vault 46 can cooperate with a riser pipe made of steel to appropriately meet fire code.

FIG. 2 shows P/V valve 40 positioned at a vent height V above grade 44 sufficient to comply with fire code together with a vault 46 positioned at a working height W and operable to enclose a P/V valve as further described herein.

While both P/V valve 40 and vault 46 are shown connected to a single P/V valve riser pipe 42 in FIG. 2, only one P/V valve is typically utilized with a single P/V valve riser pipe. Stated another way, if P/V valve 40 were implemented at vent height V, as shown in FIG. 2, then vault 46 would be rendered superfluous, as only a single P/V valve per riser pipe 42 is needed. Similarly, if vault 46 shown in FIG. 2 operatively housed a P/V valve, then another P/V valve 40 at vent height V would not be needed.

Figure 4:
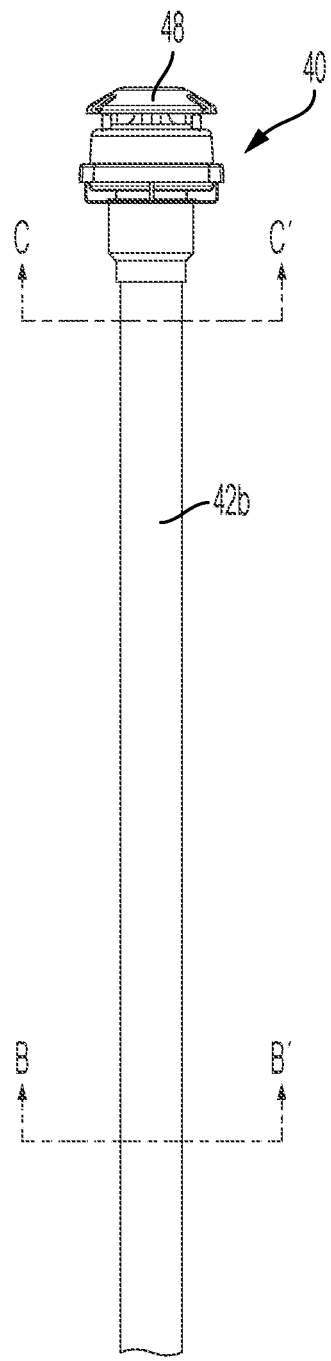
FIG. 4 is a radial elevational view of a P/V valve riser pipe including a P/V valve of the present disclosure positioned at a terminal end of the P/V valve riser pipe positioned at an appropriate height above grade in accordance with fire prevention code.

In the arrangement of FIG. 4 (and also shown in FIG. 6B), P/V valve 40 is positioned at a terminal end of P/V valve riser pipe 42b at a vent height V sufficient to meet fire prevention code, e.g., at 12 feet above grade as mandated by NFPA 30. Specifically, valve riser pipe 42b includes a central passageway that is sealed in fluid communication with ullage 28 of UST 26 such that fuel vapor and air from ullage 28 are communicated into the central passageway of valve riser pipe 42b in the event that UST 26 experiences a pressure condition. Similarly, a vacuum condition in UST 26 will communicate a negative pressure (vacuum) to the central passageway of valve riser pipe 42b. The pressure or vacuum within valve riser pipe 42b will reach P/V valve 40 and be connected to the atmosphere at an appropriate cracking pressure.

Figure 3:
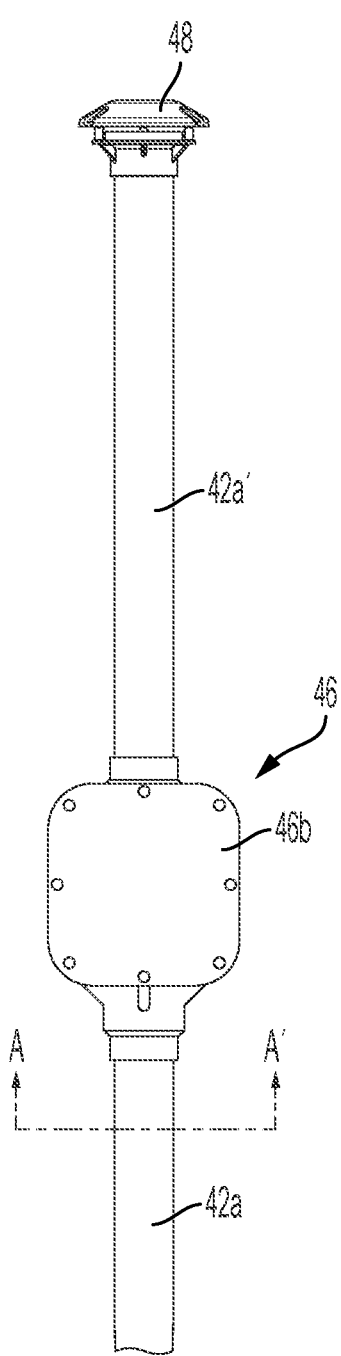
FIG. 3 is a radial elevational view of a vault positioned at a working height above grade along a P/V valve riser pipe, the vault sized and shaped to contain a P/V valve of the present disclosure and designed to hermetically seal the P/V valve therein while providing venting to atmosphere at an appropriate height above grade in accordance with fire prevention code.

In the arrangement of FIG. 3 (and also shown in FIG. 6A), P/V valve 40 is positioned in vault 46. Vault 46 forms a part of the vent conduit from ullage 28 formed by P/V valve riser pipe 42 and is positioned at working height W, e.g., a height of approximately 4-5 feet above grade 44 (FIG. 1). Vault 46 defines a chamber cross-sectional area relative to the longitudinal axis of the pressure/vacuum valve riser pipe that is the largest cross-sectional area of the pressure/vacuum valve riser pipe. Specifically, lower segment 42a of P/V valve riser pipe 42 is threadably secured and sealed relative to vault 46, as shown in detail in the cross-sectional view of FIG. 5. Similarly, upper segment 42a' is threadably secured and sealed to vault 46. With vault threadably secured to P/V valve riser pipe segments 42a and 42a', the central passageways of P/V valve riser pipe segments 42a and 42a' and in fluid communication with the cavity defined internal of vault housing 46a.

Referring to FIGS. 3, 5-8, vault 46 is formed by vault housing 46a and vault cover plate 46b. Vault housing 46a incorporates a lower threaded boss into which lower segment 42a of P/V valve riser pipe 42 is threadably secured. Vault housing 46a further includes an upper boss into which upper segment 42a' of P/V valve riser pipe 42 is threadably secured. Vault cover plate 46b is selectively secured to vault housing 46a by a plurality of fasteners, illustratively a plurality of hex head screws spaced about the perimeter of vault cover plate 46b and being received through vault cover plate 46b and threaded into apertures formed in vault housing 46a. With vault cover plate 46b secured to vault housing 46a, vault 46 cooperates with P/V riser plate 42 to form a sealed fluid path between ullage 28 (FIG. 2) of UST and ambient atmosphere above grade 44. Specifically, vent apertures are provided under rain cap 48 (FIG. 3) to allow vapor and air from ullage 28 to escape UST 26 and be vented to ambient atmosphere in an overpressure condition of UST 26 and/or to allow ambient air to enter ullage 28 of UST 26 in a vacuum condition of UST 26.

To provide selective fluid communication between ullage 28 of UST 26 and ambient, P/V valve 40 is operatively positioned within vault 46 to selectively fluidly connect ullage 28 to ambient at chosen pressure and vacuum values within UST 26. Specifically, P/V valve 40 opens or "cracks" at specific pressure and vacuum values to fluidly connect ullage 28 of UST 26 to ambient. With connections to/from P/V valve riser pipe 42 hermetically sealed and vault 46 further hermetically sealed by securement of vault cover plate 46b to vault housing 46a, connection of ullage 28 of UST 26 to ambient is controlled during normal operation of the associated fueling station by the opening and closing of P/V valve 40.

Figure 5:
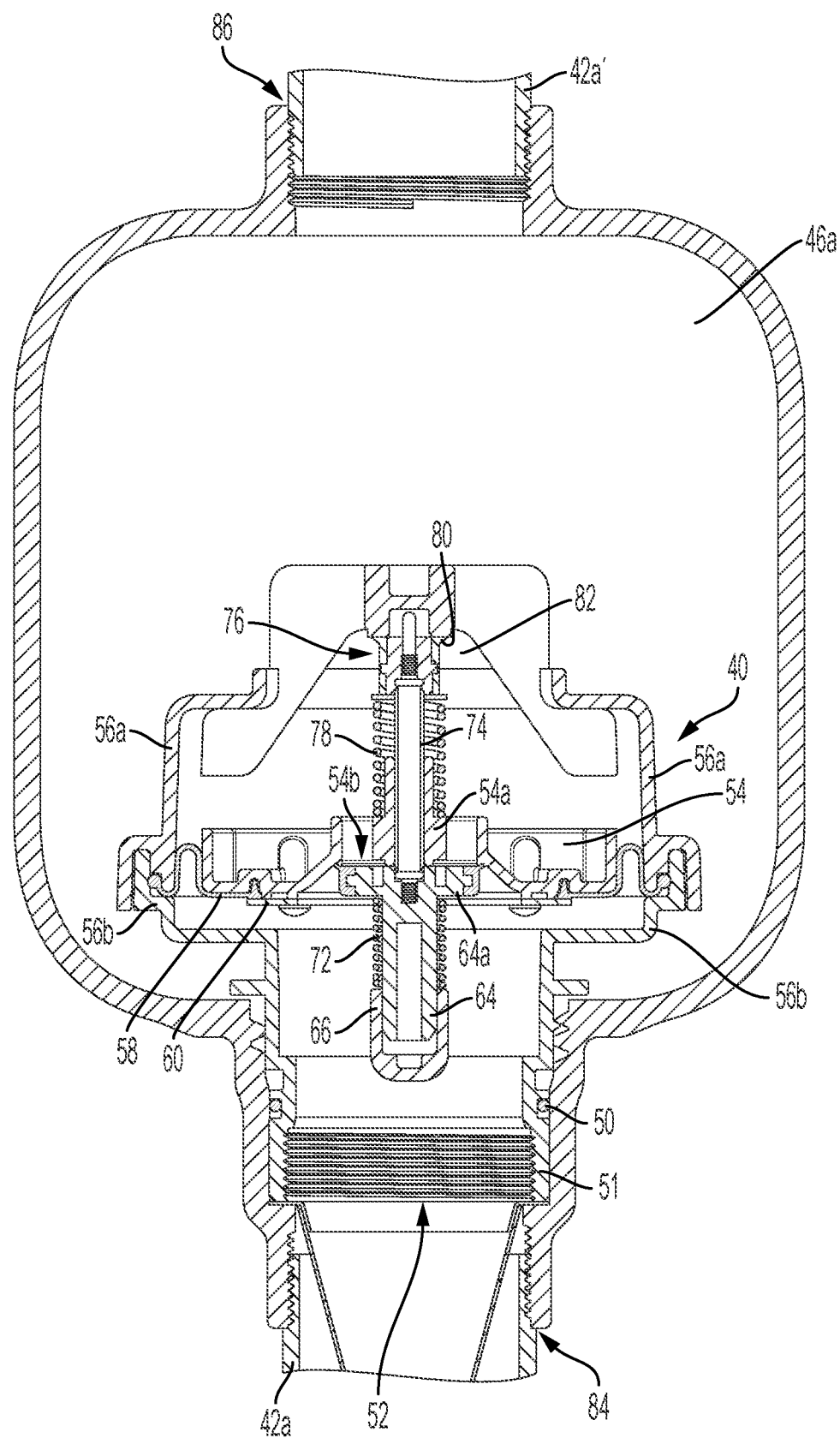
FIG. 5 is a partial, sectional view taken along line A-A' of FIG. 3.

Referring to FIG. 5, the lower boss extending from vault 46, i.e., the boss into which lower segment 42a of P/V valve riser pipe 42 is threadedly secured, features a second set of internal threads into which P/V valve 40 is threadedly secured. As illustrated, O-ring 50 is positioned within an external annular groove of connector 51 of P/V valve 40 to seal P/V valve 40 relative to vault 46. In the exemplification shown, connector 51 of P/V valve 40 features external threading allowing P/V valve 40 to be selectively operably secured within vault 46 and removed therefrom as a subassembly. Removable as a subassembly means that P/V valve 40 can be removed as a fully functional valve assembly including a housing featuring first port 52, second port 82 and a valve assembly actuatable to selectively allow a vacuum inlet flow from second port 82 of pressure/vacuum valve housing 56 to first port 52 of pressure/vacuum valve housing 56 and further actuatable to selectively allow a pressure outlet flow from first port 52 of the pressure/vacuum valve housing 56 to second port 82 of the pressure/vacuum valve housing 56. When removed from vault 46, P/V valve 40 can be secured to adapter 88 in the configuration shown in FIG. 6B and further described herein. In lieu of adapter 88, the internal threads adjacent to port 52 can be directly secured to riser pipe 42b. In operative position secured within vault 46, P/V valve 40 includes a first port 52 in fluid communication with lower segment 42a of P/V valve riser pipe 42 and; therefore, in fluid communication with ullage 28 of UST 26. The flow path through first port 52 of P/V valve 40 extends upwardly to valve piston 54, which is sealed relative to housing 56 (56a, 56b) of P/V valve 40 by diaphragm 58. More particularly, washer 60 is secured to valve piston 54, with diaphragm 58 sandwiched between washer 60 and valve piston 54. In this way, the inner diameter of ring shaped diaphragm 58 is hermetically sealed to valve piston 54. Housing 56 of P/V valve 40 comprises upper housing 56a and lower housing 56b. The outer diameter of ring shaped diaphragm 58 is sandwiched between upper housing 56a and lower housing 56b before securement of these housing elements to one another, thereby hermetically sealing the outer diameter of ring shaped diaphragm 58 to housing 56.

Figure 6A:
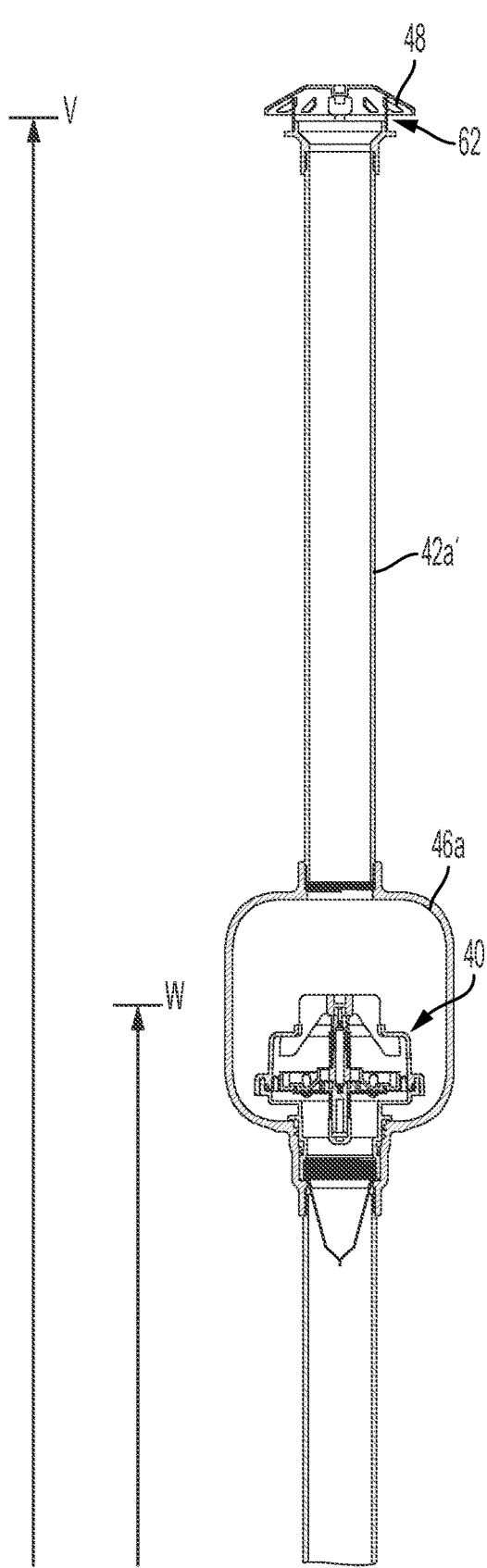
FIG. 6A is a sectional view taken along line A-A' of FIG. 3.
Figure 6B:
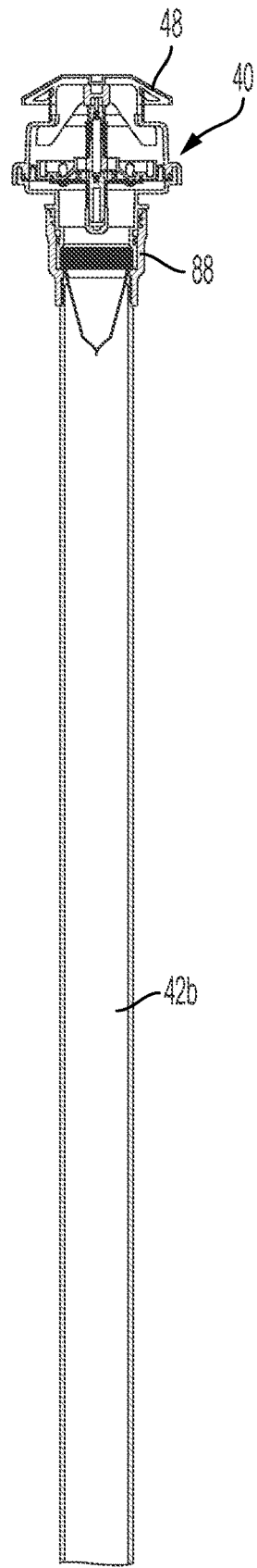
FIG. 6B is a sectional view taken along line B-B' of FIG. 4.

Adapter 88 features internal threads identical to the internal threads featured in lower boss of vault 46, thereby allowing P/V valve 40 to be alternatively threadably secured in fluid communication with either vault 46 or adapter 88 in the configurations shown, e.g., in FIGS. 6A and 6B. In this way, adapter 88, vault 46 and P/V valve 40 can be sold as a kit, with P/V valve 40 alternatively useable with either adapter 88 or vault 46. In embodiments utilizing internal threads adjacent to first port 52 of P/V valve 40, the lower boss of P/V valve 40 forming first port 52 can be directly threaded to the riser pipe, with the riser pipe defining the "adapter."

FIG. 5 illustrates P/V valve 40 operationally secured within the internal cavity defined by vault housing 46a. FIG. 6 illustrates two alternative arrangements of P/V valve 40. FIG. 6A shows P/V valve 40 operationally positioned within vault housing 46a, with upper segment 42a' of P/V valve riser pipe 42 venting to ambient through vent 62, with rain cap 48 positioned atop upper segment 42a' to cover vent 62 and block precipitation from entering upper segment 42a' of P/V valve riser pipe 42. In this configuration, upper segment 42a' of P/V valve riser pipe 42 terminates at a vent height V above grade 44, while vault 46 is positioned at a working height W above grade 44, with vent height V being greater than working height W. FIG. 6B shows an alternative arrangement in which P/V valve riser pipe 42 is not interrupted by vault 46 and includes P/V valve 40 positioned at vent height V above grade. In this configuration, P/V valve 40 vents directly to ambient.

Figure 7:
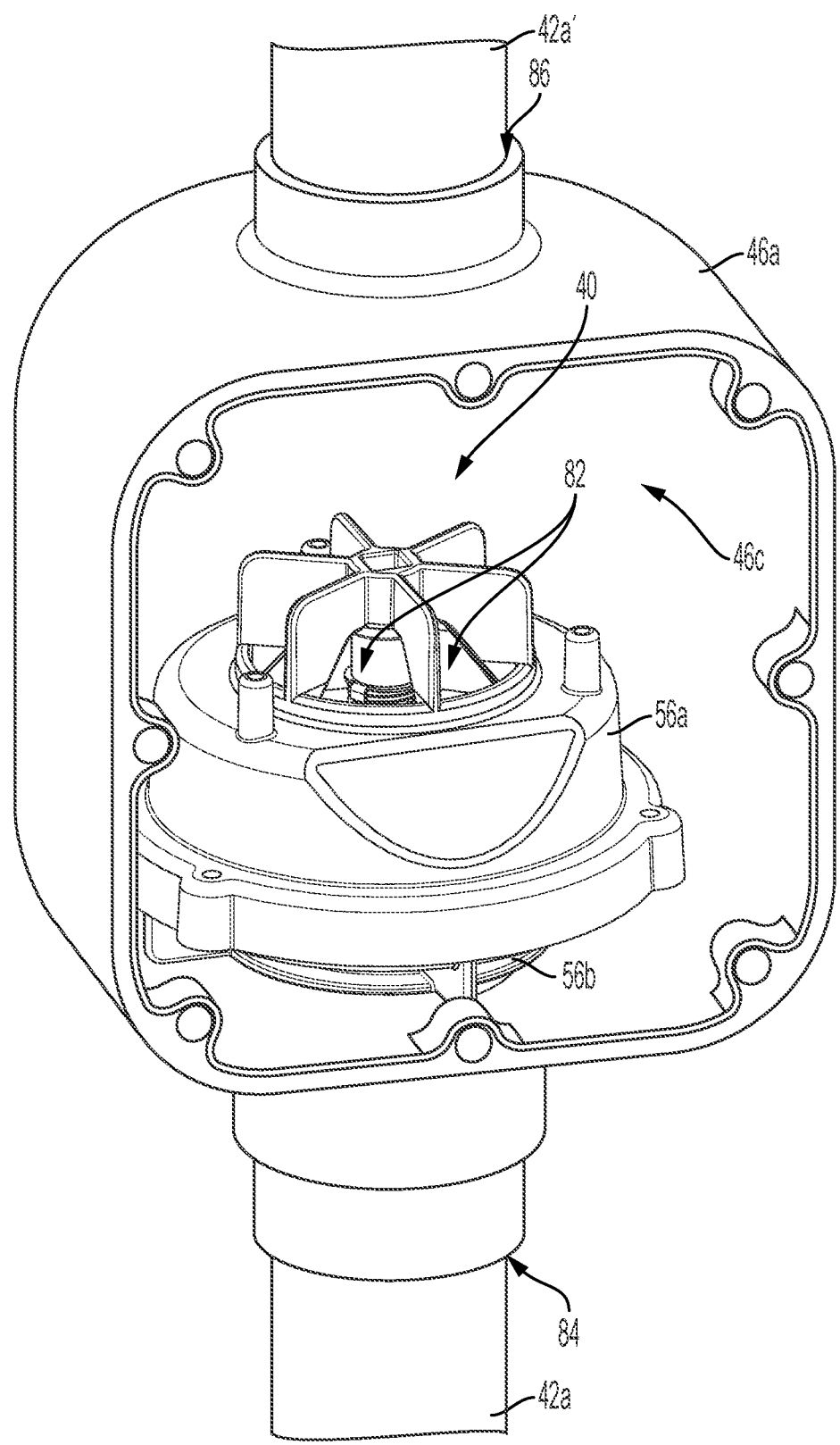
FIG. 7 is a partial perspective of the vault and P/V valve shown in FIG. 3, with the vault cover plate removed.
Figure 7A:
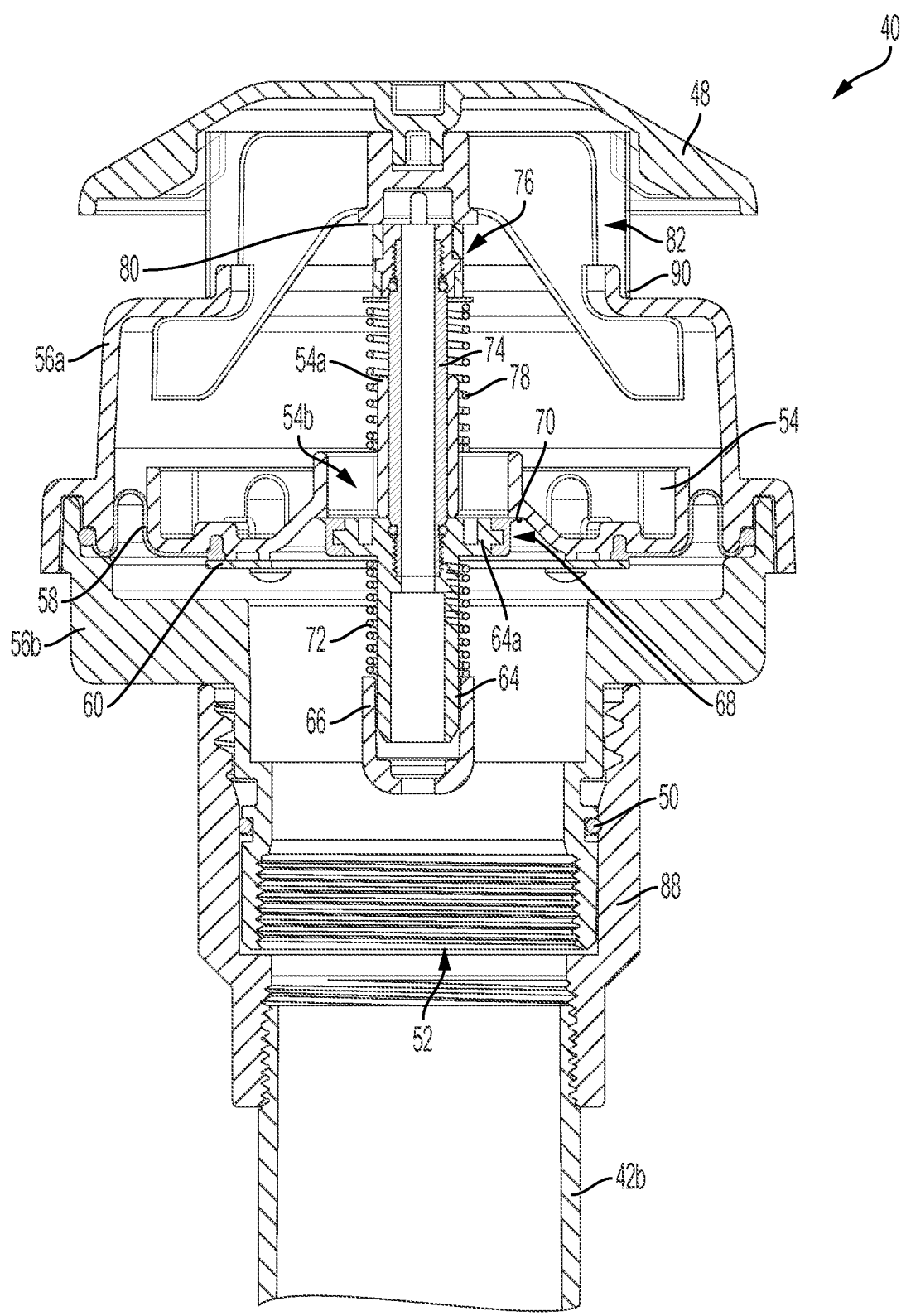
FIG. 7A is an enlarged sectional view taken along line C-C' of FIG. 4 illustrating a closed position of the P/V valve.
Figure 7B:
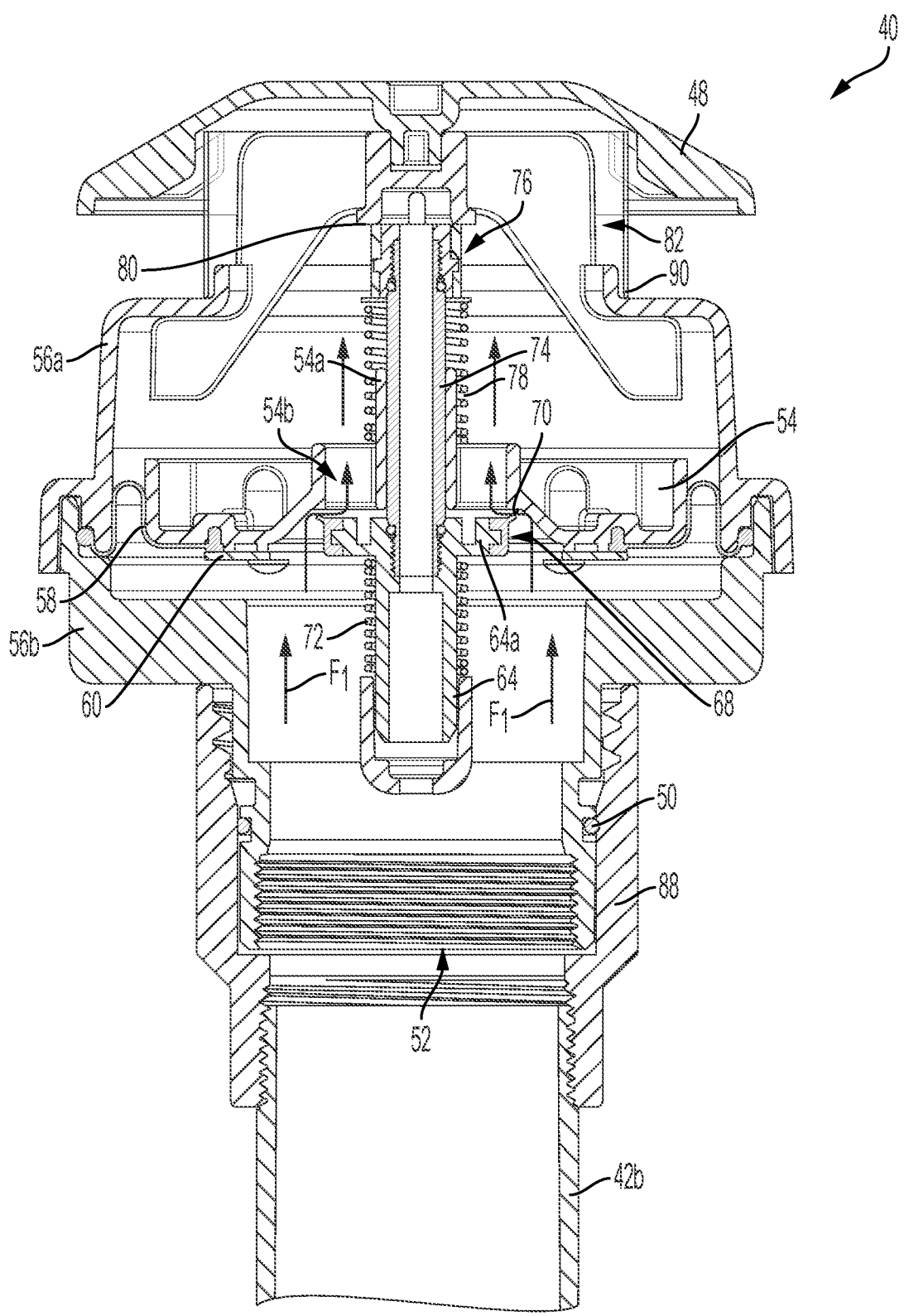
FIG. 7B is an enlarged sectional view taken along line C-C' of FIG. 4 illustrating a valve open relieving positive tank pressure position of the P/V valve.
Figure 7C:
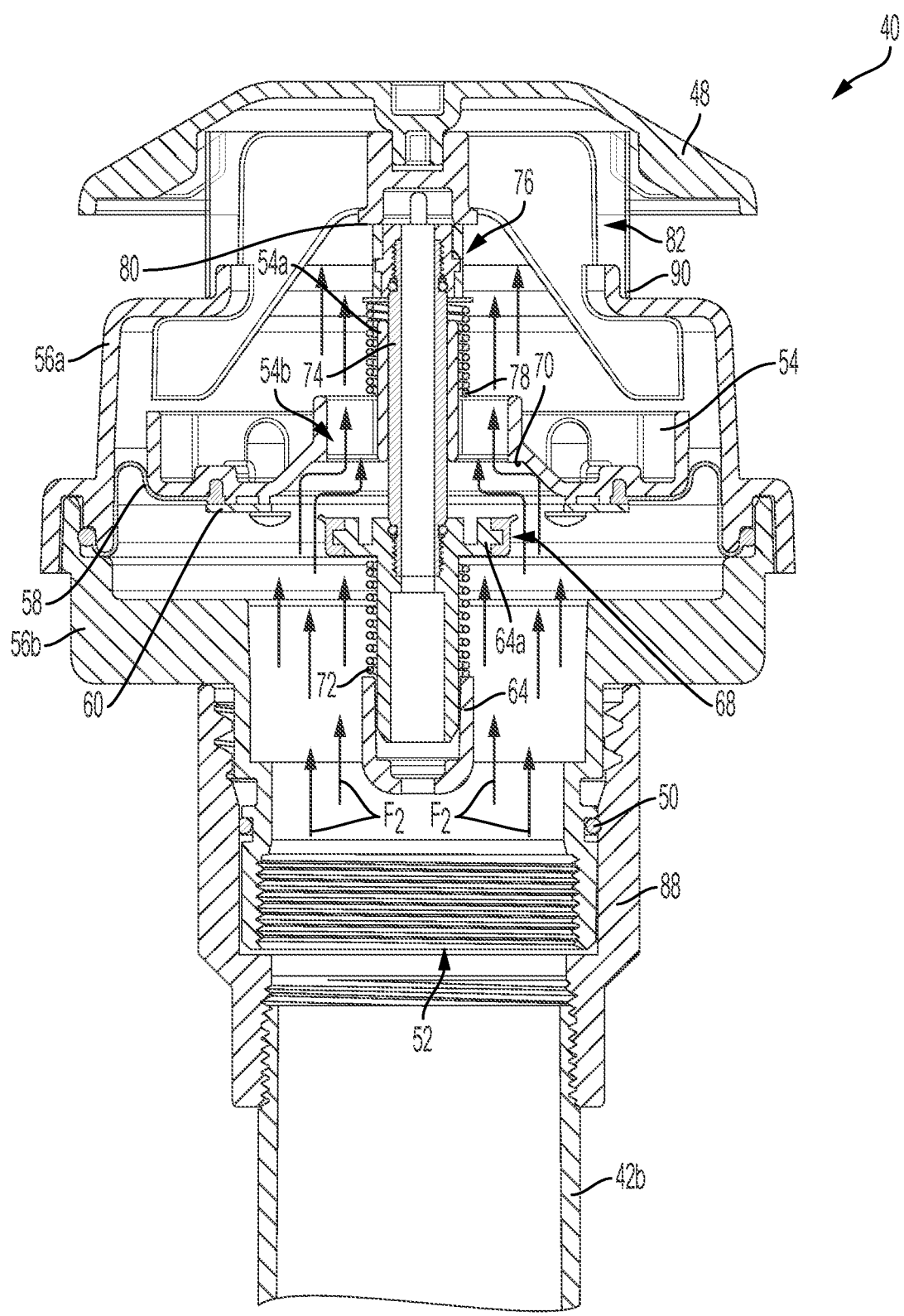
FIG. 7C is an enlarged sectional view taken along line C-C' of FIG. 4 illustrating a valve open relieving overpressure position of the P/V valve.
Figure 7D:
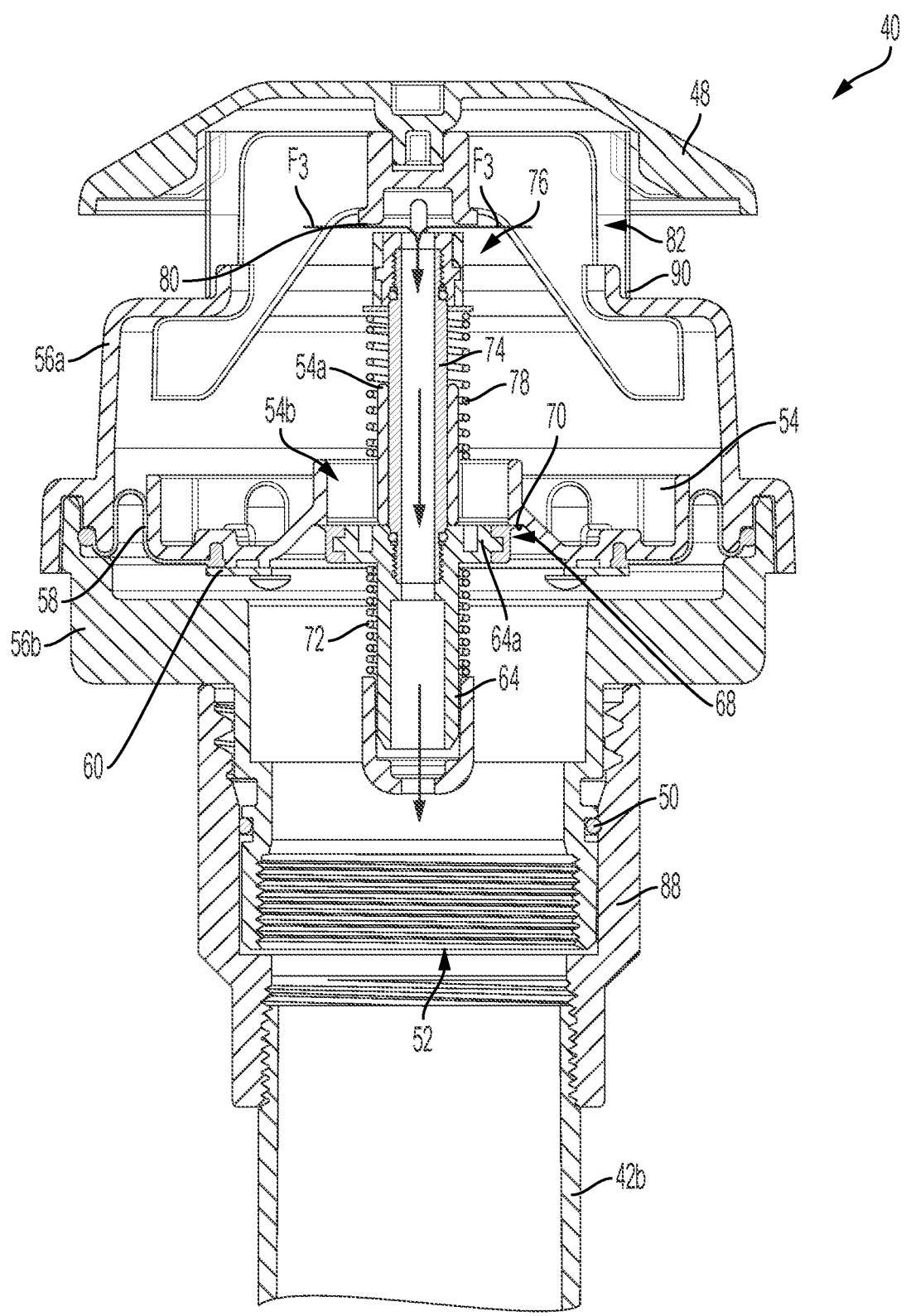
FIG. 7D is an enlarged sectional view taken along line C-C' of FIG. 4 illustrating a valve open relieving negative tank pressure (vacuum) position of the P/V valve.

FIGS. 7A-7D show P/V valve 40 is a variety of operational states, including: a closed state (FIG. 7A), a valve open relieving positive tank pressure state (FIG. 7B), a valve open relieving over-pressure condition state (FIG. 7C), and a valve open relieving negative tank pressure (i.e., tank vacuum condition) (FIG. 7D). With the following description of the structure and operation of P/V valve 40, reference is made to FIGS. 5 and 7A-7D. While FIGS. 7A-7D illustrate a configuration of P/V valve 40 as it would be utilized in the configuration of FIGS. 4 and 6B (i.e., at the terminal end of P/V valve riser pipe 42), the function of P/V valve 40 is identical when incorporated into vault 46 (see, e.g., FIGS. 3 and 6A). When P/V valve 40 is utilized in vault 46, rain cap 48 may be removed from P/V valve 40. In all other respects, P/V valve 40 remains unchanged whether it is utilized within vault 46 or at the terminal end of P/V valve riser pipe 42. Rain cap 48 may also be retained with P/V valve 40 when it is utilized in vault 46 to facilitate use of P/V valve 40 in a multi-use kit. In such an installation, rain cap 48 will, advantageously deflect condensation from upper segment 42a' from entering P/V valve 40. In these cases, P/V valve 40 is identical whether used with a vault or not.

P/V valve 40 includes lower stem 64 reciprocally supported in support 66 of lower housing 56b at a lower end of lower stem 64. Upper end 64a of lower stem 64 features radially extending pressure valve body 68. Pressure valve body 68 seats against valve seat 70 formed in valve piston 54 when P/V valve 40 maintains the closed position, as will be further described below in conjunction with the operation of P/V valve 40. As illustrated in FIG. 7A, upper end 64a of lower stem 64 includes a central radially extending ring interdigitating with the material of pressure valve body 68 to secure pressure valve body 68 for reciprocation with lower stem 64. Interposed between upper end 64a of lower stem 64 and support 66 is spring 72. Connecting shaft 74 is threadedly secured to lower stem 64, with an O-ring interposed therebetween to effect sealing between connecting shaft 74 and lower stem 64.

Connecting shaft 74 extends upwardly from lower stem 64 and through valve piston 54. More particularly, central boss 54a of valve piston 54 features a central aperture sized to slidably receive connecting shaft 74. With connecting shaft 74 positioned through central boss 54a of valve piston 54, valve piston 54 is free to reciprocate within housing 56 of P/V valve 40 along connecting shaft 74. At the end of connecting shaft 74 opposite lower stem 64, vacuum valve body 76 is threadedly secured to connecting shaft 74, with an O-ring interposed therebetween to effect sealing between connecting shaft 74 and vacuum valve body 76. Vacuum valve body 76 comprises a two-piece valve body featuring an inner support threaded to connecting shaft 74 and having a central radially extending ring interdigitating with the material of the outer body of vacuum valve body 76 to secure the two pieces of vacuum valve body 76 one to the other. Vacuum valve body 76 is, in alternative exemplifications, over-molded atop connecting shaft 74.

Spring 78 is positioned over central boss 54a of valve piston 54, with an upper end of spring 78 abutting a washer positioned intermediate vacuum valve body 76 and spring 78 and a lower end of spring 78 abutting an annular shoulder presented by valve piston 54. Vacuum valve body 76 seats against valve seat 80 when P/V valve 40 maintains the closed position, as will be further described below in conjunction with the operation of P/V valve 40.

With valve piston 54 in fluid communication with ullage 28 of UST 26 via P/V valve riser pipe 42, a vacuum or pressure within UST 26 will be applied to valve piston 54. When a sufficient valve cracking pressure (e.g., a pressure in the range of 2.5-6 inches of water column or about 620-1490 Pascal) is experienced in UST 26 and therefore applied to valve piston 54, valve piston 54 moves along the longitudinal axis of connecting shaft 74 from the position illustrated in FIG. 7A to the position illustrated in FIG. 7B. Particularly, valve piston 54 is moved by the pressure in UST 26 (and P/V valve riser pipe 42) against the biasing force of spring 78 and away from pressure valve body 68 to unseat pressure valve body 68 from valve seat 70 and fluidly connect the chamber of P/V valve housing above valve piston 54 and diaphragm 58 to the chamber of P/V valve housing below valve piston 54 and diaphragm 58. As valve piston 54 is moved upwardly against the biasing force of spring 78, lower stem 64 is held static by the force of spring 72. Particularly, spring 72 forces lower stem 64 and thereby connecting shaft 74 and vacuum valve body 76 upwardly to seat vacuum valve body 76 against valve seat 80. Pressure acting the undersurface of valve piston 54 will also encounter pressure valve body 68, cooperating with spring 72 to urge lower stem 64 and thereby connecting shaft 74 and vacuum valve body 76 upwardly to seat vacuum valve body 76 against valve seat 80. Throughout this document, "pressure" is used as a shorthand for positive pressure, i.e., pressure that is greater than atmospheric pressure. Measures of pressure such as inches of water column are understood to be positive measurements when associated with "pressure."

In the position illustrated in FIG. 7B, flow F1 through P/V valve 40 is achieved to vent the excess pressure from UST 26 to ambient. Particularly, flow F1 is comprised of fuel vapor and air from ullage 28 of UST 26 (FIG. 2). Flow F1 through P/V valve 40 begins at first port 52 of P/V valve 40 (after passing first vault port 84, if P/V valve 40 is used in conjunction with vault 46) and continues through the central aperture through washer 60, through the gap between valve seat 70 and pressure valve body 68 (i.e., the pressure outlet through P/V valve 40), through central aperture 54b of valve piston 54 and finally through second port 82 of P/V valve 40. As illustrated in the Figures and described herein, first port 52 and second port 82 of P/V valve 40 function to connect an interior of housing 56 to an exterior of housing 56, as allowed by the operation of P/V valve 40 as described in detail herein. If P/V valve 40 is used with vault 46, flow F1 enters the chamber defined by vault housing 46a before passing through upper segment 42a' of the P/V valve riser pipe and exiting to atmosphere through the vent apertures provided below rain cap 48 (FIG. 6A).

When a greater pressure condition is experienced in UST 26 (relative to the condition causing the valve to operate as illustrated in FIG. 7B), valve piston 54 is forced further upward (relative to the position illustrated in FIG. 7B) to the position illustrated in FIG. 7C, allowing an increased (relative to flow F1) flow F2 through P/V valve 40 to vent the excess pressure from UST 26 to ambient. The overpressure condition of UST 26 yielding the position of valve piston 54 shown in FIG. 7C can be due to a "bad drop," i.e., a drop of fuel from tanker truck 30 to UST 26 without proper connection and/or operation of vapor recovery equipment. In the event that P/V valve 40 is implemented in vault 46, flow F2 follow the same path as flow F1 described above.

When a sufficient valve cracking vacuum (e.g., a vacuum in the range of 6-10 inches water column or about 1490-2490 Pascal) is experienced in UST 26 and therefore applied to valve piston 54, valve piston 54 moves along the longitudinal axis of connecting shaft 74 (but not relative to connecting shaft 74) to the position illustrated in FIG. 7D. Particularly, valve piston 54 is pulled by the vacuum in UST 26 (and P/V valve riser pipe 42) against the biasing force of spring 72. More particularly, valve piston 54 is pulled against pressure valve body 68 such that valve piston 54 is pulled, together with valve body 68 and lower stem 64 against the biasing force of spring 72, thereby also pulling connecting shaft 74 and vacuum valve body 76 away from the position illustrated in FIG. 7A and toward the position illustrated in FIG. 7D. In the position illustrated in FIG. 7D, vacuum valve body 76 is unseated from valve seat 80 to create a vent inlet in P/V valve 40 and fluidly connect the chamber of P/V valve housing above valve piston 54 and diaphragm 58 to the chamber of P/V valve housing below valve piston 54 and diaphragm 58. Particularly, with vacuum valve body 76 unseated from valve seat 80, ambient air can be pulled in flow F3 into P/V valve 40, through the central cannula through vacuum valve body 76, connecting shaft 74 and lower stem 64 to P/V valve riser pipe 42 and finally ullage 28 of UST 26. Throughout this document, "vacuum" is used to denote negative pressure, i.e., pressure that is less than atmospheric pressure. Measures of pressure such as inches of water column are understood to be negative values when associated with "vacuum."

This document describes positive cracking pressure (2.5-6 inches of water column) of P/V valve 40 as well as negative cracking pressure or vacuum (6-10 inches of water column). Another important functional aspect of P/V valve 40 is the leak rate, i.e., the rate at which vapor and air from the storage tank can pass through P/V valve 40 at a positive pressure less than the cracking pressure and/or the rate at which ambient air can pass through P/V valve 40 at a vacuum less than the negative cracking pressure. The valve of the present disclosure features a positive pressure leak rate of less than or equal to 0.057 cubic feet per hour (CFH) at +2.0 inches of water column. The valve of the present disclosure also features a negative pressure (vacuum) leak rate of less than or equal to 0.21 CFH at −4.0 inches of water column. These values are 1/3 of the maximum allowable leak rates to account for the fact that three storage tanks can be manifolded to a single P/V valve 40 or each tank can utilize its own riser pipe and P/V valve 40. By setting the leak rate at 1/3 of the maximum allowed by EPA/CARB, P/V valve 40 is useable in either setup.

Figure 8:
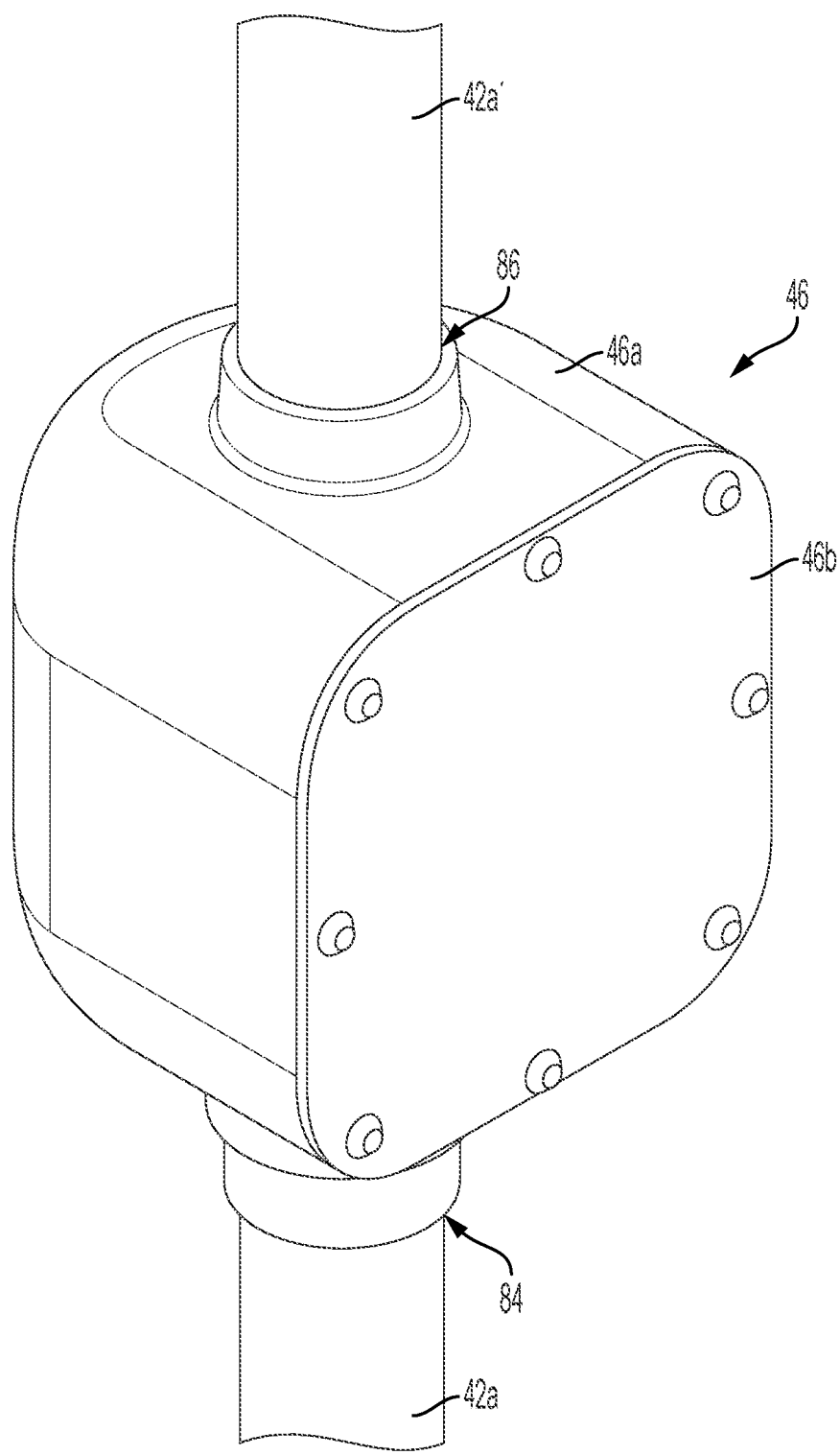
FIG. 8 is a perspective view of a vault riser pipe arrangement in accordance with the present disclosure.
Figure 9:
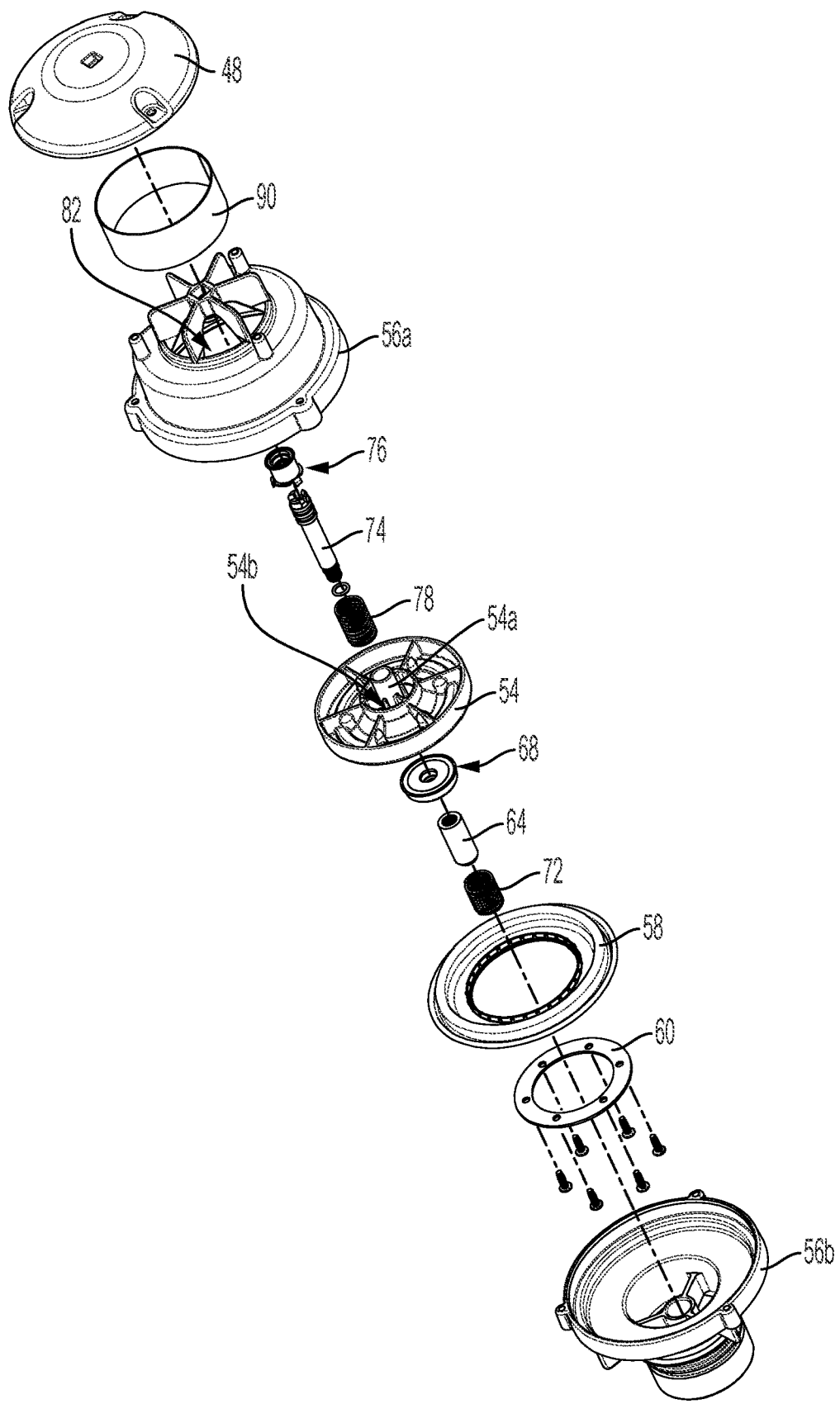
FIG. 9 is a perspective, exploded view of the P/V valve of the present disclosure.

When utilized in the configuration illustrated in FIGS. 4 and 6B, second port 82 (see, e.g., FIG. 7A) fluidly connects the interior of housing 56 of P/V valve 40 to ambient through screen 90 (FIG. 9). In the configuration illustrated in FIGS. 3 and 6A (i.e., in conjunction with vault 46), second port 82 fluidly connects the interior of housing 56 of P/V valve 40 to interior 46c (FIG. 7) of vault 46. In use, vault 46 is hermetically sealed and enclose P/V valve 40 by securement of vault cover plate 46b to vault housing 46a (FIG. 8). With vault 46 hermetically sealed, flow (F1, F2, or F3) through second port 82 of P/V valve 40 connects to ambient via vent 62 located at vent height V above grade 44 (FIGS. 2 and 6A).

When P/V valve 40 is utilized in conjunction with vault 46, P/V valve 40 can be positioned at working height W above grade to be serviced by a technician positioned at grade 44 without requiring the assistance of a ladder or lift equipment. To service P/V valve 40, a technician removes the fasteners securing vault cover plate 46b in place to access P/V valve 40. After removing vault cover plate 46b, P/V valve 40 can be unthreaded from vault 46 for servicing or replacement. In a way that advantageously facilitates flow through P/V valve 40 and P/V valve riser pipe segments 42a, 42a', vault 46 is positioned in-line with valve riser pipe segments 42a, 42a'. Particularly, the longitudinal axes of riser pipe segments 42a, 42a' both intersect P/V valve 40 when it is operably positioned in vault 46, as illustrated, e.g., in FIG. 7. A P/V valve utilized in conjunction with vault 46 can be inexpensively made of plastic, owing to the protection from tampering provided by vault 46.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pressure/vacuum vent for a storage tank, comprising:
 a pressure/vacuum valve riser pipe for fluid communication with the storage tank and with atmosphere, the pressure/vacuum valve riser pipe including a storage tank end and an atmosphere port, the pressure/vacuum valve riser pipe including a chamber positioned intermediate the storage tank end and the atmosphere port; and
 a pressure/vacuum valve, the chamber sized to receive the pressure/vacuum valve, the pressure/vacuum valve selectively securable within and removable from the chamber, the pressure/vacuum valve in fluid communication with the pressure/vacuum valve riser pipe and operable to selectively block flow through the pressure/vacuum valve riser pipe, the chamber positioned in-line with a longitudinal axis of the pressure/vacuum valve riser pipe such that the longitudinal axis of the pressure/vacuum valve riser pipe intersects the pressure/vacuum valve when the pressure/vacuum valve is secured within the chamber in fluid communication with the pressure/vacuum valve riser pipe and operable to selectively block fluid flow through the pressure/vacuum valve riser pipe; and
 wherein the pressure/vacuum valve riser pipe comprises a vault, the vault comprising:
  a vault housing defining an interior, the interior comprising the chamber sized to receive the pressure/vacuum valve; and
  a vault cover selectively securable and hermetically sealable to the vault housing, whereby the vault cover is selectively removable to provide access to the pressure/vacuum valve contained in the interior of the vault housing; and
  wherein the pressure/vacuum valve is threadably engaged with the vault, such that the pressure/vacuum valve can be unthreaded from the vault with the vault cover open.

2. The pressure/vacuum vent of claim 1, wherein the chamber defines a chamber cross sectional area relative to the longitudinal axis of the pressure/vacuum valve riser pipe comprising a largest cross-sectional area of the pressure/vacuum valve riser pipe.

3. The pressure/vacuum vent of claim 1, wherein the chamber is positioned at a chamber height above a grade level, the chamber height positioned at a height above the grade level to allow service by a technician positioned at the grade level without the assistance of a ladder or lift equipment, the pressure/vacuum valve riser pipe in fluid communication with atmosphere at a vent height above the grade level, the vent height being greater than the chamber height.

4. The pressure/vacuum vent of claim 1, wherein the pressure/vacuum valve riser pipe comprises a lower segment of the pressure/vacuum valve riser pipe fluidly connected to the vault and an upper segment of the pressure/vacuum valve riser pipe fluidly connected to the vault, the lower segment of the pressure/vacuum valve riser pipe and the vault positioned in-line with the upper segment of the pressure/vacuum valve riser pipe such that a longitudinal axis of the lower segment of the pressure/vacuum valve riser pipe and a longitudinal axis of the upper segment of the pressure/vacuum riser pipe both intersect the pressure/vacuum valve when it is operably secured within the vault.

5. The pressure/vacuum vent of claim 1, wherein the pressure/vacuum valve comprises:
a pressure/vacuum valve housing defining a first port fluidly connecting an interior of the pressure/vacuum valve housing and an exterior of the pressure/vacuum valve housing, and a second port fluidly connecting an interior of the pressure/vacuum valve housing and an exterior of the pressure/vacuum valve housing;
a vent inlet selectively openable to allow a vacuum inlet flow from the second port of the pressure/vacuum valve housing to the first port of the pressure/vacuum valve housing; and
a pressure outlet selectively openable to allow a pressure outlet flow from the first port of the pressure/vacuum valve housing to the second port of the pressure/vacuum valve housing.

6. The pressure/vacuum vent of claim 4, wherein the pressure/vacuum valve is selectively securable relative to the vault, the pressure/vacuum valve removable from the vault while the lower segment of the pressure/vacuum valve riser pipe and the upper segment of the pressure/vacuum valve riser pipe remain fluidly connected to the vault.

7. The pressure/vacuum vent of claim 1, wherein the vault is made from ductile iron or steel.

8. The pressure/vacuum vent of claim 7, wherein the pressure/vacuum valve is made of plastic.

9. The pressure/vacuum vent of claim 1, wherein the pressure/vacuum valve is located 4-5 feet above a grade level and the atmosphere port of the pressure/vacuum valve riser pipe is located at least 12 feet above the grade level.

* * * * *